United States Patent
Webb et al.

(10) Patent No.: US 9,532,352 B2
(45) Date of Patent: Dec. 27, 2016

(54) METHOD AND APPARATUS FOR INCREMENTAL-REDUNDANCY HARQ PROCESS

(71) Applicant: SONY CORPORATION, Tokyo (JP)

(72) Inventors: Matthew Webb, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/431,600

(22) PCT Filed: Oct. 21, 2013

(86) PCT No.: PCT/GB2013/052739
§ 371 (c)(1),
(2) Date: Mar. 26, 2015

(87) PCT Pub. No.: WO2014/068278
PCT Pub. Date: May 8, 2014

(65) Prior Publication Data
US 2015/0282130 A1     Oct. 1, 2015

(30) Foreign Application Priority Data
Nov. 2, 2012 (GB) .................................. 1219709.1

(51) Int. Cl.
*H04W 72/04* (2009.01)
*H04L 1/08* (2006.01)
(Continued)

(52) U.S. Cl.
CPC .............. *H04W 72/042* (2013.01); *H04L 1/08* (2013.01); *H04L 1/1812* (2013.01);
(Continued)

(58) Field of Classification Search
CPC ... H40W 72/042; H04L 1/1812; H04L 5/0055; H04L 1/1887; H04L 1/1819; H04L 1/189; H04W 88/08; H04W 72/042; H04W 72/0413
(Continued)

(56) References Cited

U.S. PATENT DOCUMENTS 8,605,674 B2 * 12/2013 Park ......................... H04L 1/08
370/329
8,705,431 B2 * 4/2014 Torsner ................. H04L 1/1664
370/315

(Continued)

FOREIGN PATENT DOCUMENTS

WO    WO 2009/123549 A2    10/2009

OTHER PUBLICATIONS

U.S. Appl. No. 14/429,171, filed Mar. 18, 2015, Matthew Webb, et al.
(Continued)

*Primary Examiner* — Luat Phung
*Assistant Examiner* — Thomas R Cairns
(74) *Attorney, Agent, or Firm* — Oblon, McClelland, Maier & Neustadt, L.L.P.

(57) ABSTRACT

A method controlling wireless communication of a data block from a terminal device to a base station includes: making a first uplink data transmission for the data block in association with a first retransmission protocol process and obtaining a corresponding first acknowledgement indication indicating whether the data block has been successfully communicated to the base station; making a second uplink data transmission for the data block in association with a second retransmission protocol process and obtaining a corresponding second acknowledgement indication, the second transmission initiated before the first acknowledgement indication is obtained; determining whether to avoid scheduling a data retransmission in association with the first retransmission protocol process based on the first and second response signallings, avoiding retransmission of data in association with the first retransmission protocol process if either one of the first or second acknowledgement indication indicates the data block has been successfully communicated to the base station.

44 Claims, 6 Drawing Sheets

(51) Int. Cl.
*H04L 1/18* (2006.01)
*H04L 5/00* (2006.01)
*H04W 88/08* (2009.01)

(52) U.S. Cl.
CPC .......... *H04L 1/1822* (2013.01); *H04L 5/0055* (2013.01); *H04W 88/08* (2013.01)

(58) Field of Classification Search
USPC .......................................... 370/329; 714/748
See application file for complete search history.

(56) References Cited

U.S. PATENT DOCUMENTS

| | | | | |
|---|---|---|---|---|
| 8,817,734 | B2* | 8/2014 | Khoryaev | H04L 5/1469 370/252 |
| 2006/0034285 | A1 | 2/2006 | Pirskanen et al. | |
| 2009/0270103 | A1 | 10/2009 | Pani et al. | |
| 2009/0307554 | A1* | 12/2009 | Marinier | H04L 1/1812 714/748 |
| 2010/0275086 | A1* | 10/2010 | Bergquist | H04L 1/1812 714/748 |
| 2011/0126068 | A1 | 5/2011 | Lee et al. | |
| 2012/0057560 | A1 | 3/2012 | Park et al. | |
| 2013/0250924 | A1* | 9/2013 | Chen | H04L 1/1819 370/336 |

OTHER PUBLICATIONS

International Search Report issued Jan. 7, 2014 in PCT/GB2013/052739 filed Oct. 21, 2013.
Search Report issued Mar. 26, 2013 in United Kingdom Patent Application No. GB 1219709.1 filed Nov. 2, 2012.
Harri Holma, et al., "Basic System Architecture Configuration with only E-UTRAN Access Network", LTE for UMTS; OFDMA and SC-FDMA Based Radio Access, Apr. 2009, 4 Pages.
"LTE; Evolved Universal Terrestrial Radio Access (E-UTRA); Medium Access Control (MAC) protocol specification" 3GPP TS 136.321, vol. 10.6.0, Oct. 2012, 56 Pages.
"Multi-Process Transmission Technique to Improve Uplink Coverage for LTE" 3GPP TSG-RAN WG1 #51-bis, vol. R1-080443, Jan. 14-18, 2008, 9 Pages.
"On the Time Duration Field in the Uplink Scheduling Grant" 3GPP TSG-RAN WG2 #60, vol. R2-074889, Nov. 5-9, 2007, 7 pages.
"HARQ operation in case of UL Power Limitation" 3GPP TSG-RAN WG2 #60, vol. R2-074940, Nov. 5-9, 2007, 5 pages.

\* cited by examiner

METHOD AND APPARATUS FOR INCREMENTAL-REDUNDANCY HARQ PROCESS

CROSS-REFERENCE TO RELATED APPLICATIONS

The present application is based on PCT/GB2013/052739 filed Oct. 21, 2013, and claims priority to British Patent Application 1219709.1, filed in the UK IPO on Nov. 2, 2012, the entire contents of each of which being incorporated herein by reference.

BACKGROUND OF THE INVENTION

The present invention relates to methods, systems and apparatus for use in wireless (mobile) telecommunications networks. In particular, embodiments of the invention relate to retransmission protocols and associated schemes for managing retransmissions of data in such networks.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and there is a corresponding desire in such networks to provide for reliable communications over increasingly large coverage areas.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP (RTM) body and also described in many books on the subject, for example, Holma H. and Toskala A [1]. The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data between the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

One important aspect of wireless telecommunications networks is the provision of retransmission protocols to improve the overall reliability of data transmissions in circumstances where individual transmissions may fail. The provision of appropriate retransmission protocols becomes more significant in circumstances where there is a higher chance of failed transmissions. Accordingly, retransmission protocols can be especially significant where radio propagation conditions are more challenging, for example in respect of a terminal device at the edge of a cell.

In conventional telecommunications networks, including LTE-based networks, retransmission protocols based around HARQ (Hybrid Automatic Repeat reQuest) procedures are often employed. See, for example, Section 5.4.2 in ETSI TS 136.321 v10.6.0 (2012-10) [2] for an overview of HARQ in respect of LTE uplink communications.

The basic principle of hybrid ARQ (HARQ) is that in association with the transmission of a given block of data, for example in uplink from a terminal device (UE) to a base station (eNB), there is sent in the opposite direction (i.e. in this case downlink from the base station to the terminal device) some feedback (acknowledgement signalling) indicating whether the uplink transmission was successfully received. Acknowledgement signalling indicating successful receipt of the associated uplink transmission is commonly referred to as an 'ACK' while acknowledgement signalling indicating non-successful receipt of the associated uplink transmission is commonly referred to as a 'NACK'. In this regard it may be noted that the term "acknowledgment signalling" is used herein as a convenient term for the feedback/response signalling associated with retransmission protocols and the term is used to refer to this signalling generally and regardless of whether the signalling is indicating successful receipt of data (ACK) or unsuccessful receipt of data (NACK). That is to say the term "acknowledgment signalling" is intended to encompass both positive acknowledgement signalling (ACK signalling) and negative acknowledgement signalling (NACK signalling) In this regard acknowledgement signalling may also be referred to as ACK/NACK signalling, feedback signalling and response signalling.

Uplink data will typically include some data bits (systematic bits) and some parity bits associated with forward error correction coding (FEC). If a base station fails to correctly receive a given transmission of uplink data then NACK signalling will be sent back to the UE.

One retransmission approach would be for the UE to retransmit the data using a different combination of systematic and parity bits. In LTE, these different combinations are referred to as redundancy versions (RVs). An eNB receiving such a retransmission comprising a different RV is able to combine the two (or more) RVs in an effort to increase the likelihood of correct decoding. This process is known as an incremental redundancy process.

Another retransmission approach would be for the UE to retransmit the same RV (i.e. comprising the same set of systematic and parity bits). The eNB may then use an approach of maximal ratio combining or similar to optimally combine the two copies of the same data in an effort to increase the likelihood of correct decoding in a process known as Chase combining.

LTE networks provide for the possibility of combining these two principles by a UE first transmitting a sequence of four different RVs (incremental redundancy) without receiving any downlink ACK/NACK signalling followed by a repeated transmission of the four different RVs (permitting Chase combining) if the base station is unable to correctly decode the uplink data from the initial sequence of four RVs. This approach is known as TTI bundling.

A HARQ procedure relying only on Chase combining may require less buffering capability at the receiving end—the eNB in this example—than incremental redundancy since no new systematic/parity bits are received in retransmissions. On the other hand, incremental redundancy increases the likelihood of earlier successful reception at the price of increased buffering.

In accordance with established and well understood LTE principles, a medium access layer (MAC) delivers a transport block (TB) to a physical layer (PHY) for uplink transmission once every transmission time interval (TTI). A TTI's duration corresponds with a subframe, i.e. 1 ms. From the TB, the PHY derives four RVs (discussed further below) which can be used for respective (re)transmissions. In general the RVs may be transmitted in any order, but the default order is RV0-RV2-RV3-RV1.

Thus, in order to communicate a given TB, in one example a UE might first transmit a sequence of data bits corresponding to RV0 in a given TTI. For the purposes of explanation, a sequence of TTIs comprising an uplink radio frame structure may be considered as being sequentially numbered with the first RV for the data being transmitted in TTI 0. If the base station is able to decode the TB from the transmission it will communicate an ACK to the UE. On receipt of an ACK the HARQ process is able to receive the next transport block for uplink delivery. However, if the base station is unable to decode the TB from the transmission it will communicate a NACK to the UE. On receipt of a NACK the HARQ process causes a retransmission of the TB using RV2 to be made. If the base station is able to decode the TB from the combined transmissions of RV0 and RV2 it will communicate an ACK to the UE. If the base station still cannot correctly decodes the TB, it will send another NACK. This will result in the HARQ process retransmitting the TB using RV3, and so on.

To allow time for processing of the received signals and transmission/decoding of the HARQ feedback, in accordance with the LTE standards, for both uplink and downlink, the ACK/NACK signalling for basic HARQ operation is sent in the fourth subframe after an uplink transmission, and any required retransmission are sent in the fourth subframe after that in what is termed a stop-and-wait (SAW) operation.

The basic HARQ timing in this respect is schematically represented in FIG. 2. FIG. 2 schematically shows a series of TTIs for an LTE-based communications network. The TTIs are sequentially numbered 0, 1, 2 . . . and so on with increasing time relative to the TTI in which an initial transmission of RV0 associated with a particular TB is made. Thus, RV0 is transmitted in TTI 0 and the HARQ process governing transmission of the TB waits until TTI 4 to receive a corresponding ACK or NACK associated with this transmission. In the example of FIG. 2, a NACK is received in TTI 4, and so the HARQ process arranges for retransmission using RV2 in TTI 8. Again it is assumed this transmission does not allow the base station to correctly decodes the TB, and so a NACK is received in TTI 12, resulting in the HARQ process arranging for retransmission using RV3 in TTI 16, and so on.

As can be seen from FIG. 2, the majority of TTIs (e.g. TTI 1 to TTI 7 and TTI 9 to TTI 15) play no role in the transmission of the transport block under control of the HARQ process discussed above. In order to increase efficiency a UE may therefore operate eight HARQ processes in parallel with each HARQ process governing transmission of different transport blocks. A first HARQ process operates with uplink data transmissions in TTIs 0, 8, 16, . . . etc., and downlink ACK/NACK signalling in TTIs 4, 12, 20, . . . as schematically shown in FIG. 2. A second HARQ process operates in parallel (but shifted one TTI) with uplink data transmissions in TTIs 1, 9, 17, . . . etc., and downlink ACK/NACK signalling in TTIs 5, 13, 21, . . . etc. Other HARQ processes operate on the other TTIs in a similar manner up to an eighth HARQ process operating with uplink data transmissions in TTIs 7, 15, 23, . . . etc., and downlink ACK/NACK signalling in TTIs 11, 19, 27, . . . etc. Each HARQ process is associated with its own buffer for uplink data.

Thus basic HARQ operation for uplink in a conventional LTE network provides for eight HARQ processes running in parallel and assigned to specific TTIs. This is reduced to four parallel HARQ processes if TTI bundling is employed, as discussed further below. The parallel HARQ processes are maintained by a single HARQ entity in the MAC layer at the UE so that while some HARQ processes stop-and-wait to receive ACK/NACKs, other processes can be transmitting data. Each uplink (UL) HARQ process may only transmit in specific TTIs as indicated above with reference to FIG. 2. If a particular HARQ process has nothing to transmit in a particular TTI to which it is assigned, no other UL HARQ process from that UE can make use of the TTI. This is, in some respects, in contrast to downlink HARQ processes for which there is increased scheduling flexibility for transmissions and any retransmissions.

In the context of an LTE-type network with uplink transmissions on PUSCH (physical uplink shared channel), the base station (eNB) can provide HARQ feedback (ACK/NACK signalling) for a given HARQ process in either of two ways.

A first way is on a PDCCH (physical downlink control channel) in DCI (downlink control information) Format 0 (or 4 with PUSCH Transmission Mode 2). Among the fields the DCI message can contain are the following of relevance to UL HARQ:

a. The New Data Indicator (NDI).
 b. The RV to be used.
 c. The modulation and coding scheme (MCS) to be used.
 d. An UL resource grant.

If NDI is toggled as compared with the last time it was received, the UE determines that it should proceed with transmitting new data (a new TB) in accordance with the rest of the information on PDCCH. If NDI is not toggled, the HARQ process at the UE determines that it should retransmit data associated with the previously transmitted TB using the potentially different RV, MCS, and grant indicated. This approach may be referred to as 'adaptive synchronous HARQ', since the MCS can be altered dynamically, but the fixed timeline represented in FIG. 2 must still be adhered to.

A second way is on PHICH (physical HARQ indicator channel). This encodes a single-bit HARQ Indicator (HI) with '1' for ACK and '0' for NACK. PHICH transmission is distributed across the whole system bandwidth in the control region at the start of a subframe in which it occurs. If the UE does not receive a PDCCH containing DCI Format 0 (or Format 4 in PUSCH Transmission Mode 2), it uses the HI decoded from PHICH. If HI=0, the UE retransmits data associated with the previously-transmitted TB using the same MCS and grant as previously, but cycles through the RVs in a predefined order (e.g. RV0-RV2-RV3-RV1), as discussed above. This approach may be referred to as 'non-adaptive synchronous HARQ' since the MCS cannot be altered and the fixed timeline represented in FIG. 2 must be adhered to. If HI=1 (corresponding to an ACK), the UE does not retransmit but waits to receive PDCCH before it can continue transmitting. Such a PDCCH could arrive in the same subframe, and would typically have NDI toggled indicating data for a new TB should be transmitted on the associated uplink resource grant provided by the PDCCH.

If there are two spatial layers in use, an independent PHICH is sent for each spatial layer. If carrier aggregation (CA) is in use, there is one PHICH per layer per carrier, and PHICH is sent on the same component carrier as sends the uplink resource grant to which the HARQ feedback corresponds.

Multiple PHICHs can be sent in the same physical resources (in terms of time and frequency), with coinciding ("overlapping") PHICHs being scrambled by one of eight complex orthogonal Walsh sequences. The resources and sequence are signalled implicitly by the eNB as a function of parameters of the UL resource allocation.

The UE has an RRC configuration limiting the maximum total number of HARQ retransmissions before it must report failure to the Radio Link Control (RLC) layer.

The above has provided an overview of what might be termed "basic" HARQ operation in LTE. A possible drawback with this type of approach is that the delays between retransmissions of RVs associated with a TB which a base station does not correctly decode can introduce significant delays for uplink traffic. This is especially so in circumstances where radio channel conditions are relatively poor. An alternative HARQ mode which aims to reduce these issues is associated with so-called TTI bundling With TTI bundling the four RVs associated with a given TB are transmitted in four consecutive TTIs but the base station does not send any associated downlink ACK/NACK signalling until four TTIs after the final transmission. The same MCS and grant allocation are used in all four TTIs. This approach quickly provides a base station with all four RVs to improve the likelihood of early correct decoding of the associated TB at the cost of potentially wasteful transmissions (for example if the base station could have correctly decoded the TB from the first two RVs, the transmission of the next two RVs was not necessary). With TTI bundling a single HARQ process governs the retransmission protocol for the bundle of four TTIs in which the four RVs are transmitted.

The HARQ process timings associated with TTI bundling in LTE are schematically represented in FIG. 3. This is similar to, and will be understood from, the above-description of FIG. 2. As schematically shown in FIG. 3, redundancy versions associated with a first transport block, TB1, are transmitted in TTI is 0 to 3 (conventionally in the order RV0-RV2-RV3-RV1). Transmission of the four RVs associated with TB1 is collectively governed by a first HARQ process, H1. Acknowledgement signalling associated with a particular HARQ process for TTI bundling in LTE is transmitted in the fourth TTI after transmission of the last RV of the TB. If the acknowledgement signalling indicates the base station was unable to correctly decode the TB, the HARQ process arranges for the four RVs to be transmitted as another bundle starting in the 13th TTI after transmission of the last RV of the TB in the previous attempt. Compared to "normal" HARQ operation, for example as represented in FIG. 2, this represents a significant increase in potential latency if a base station is unable to decode a TB from a first bundled transmission of RVs.

Thus, referring to FIG. 3, the HARQ process H1 governing transmission of the TB1 waits until TTI 7 to receive a corresponding ACK or NACK associated with the transmission of TB1. In this example NACK signalling is received. The HARQ process H1 therefore operates to retransmit the RV bundle associated with TB1 in TTIs 16, 17, 18 and 19, and awaits associated acknowledgement signalling in TTI 23.

As with non-TTI bundling HARQ operation discussed above reference to FIG. 2, multiple TTI-bundled HARQ processes can operate in parallel with each process governing transmission of a different transport block. Thus, referring to FIG. 3, a second HARQ process H2 is shown controlling transmission of four RVs associated with TB2 in TTIs 4 to 7. In accordance with the defined timings discussed above, acknowledgement signalling for this HARQ process is received in TTI 11, and in this example it is assumed to be an ACK. Accordingly, HARQ process H2 clears its buffer of data associated with TB2 and prepares for transmission of a new TB in the next series of TTIs allocated to HARQ process H2 (i.e. TTIs 20 to 23). Other HARQ processes operate on the other TTIs in a similar manner with a total of four HARQ processes (labelled H1, H2, H3 and H4 in FIG. 3).

As noted above, HARQ processes generally involve (re)transmissions of so-called redundancy versions (RVs) associated with transport blocks for uplink communication on PUCSCH. The forward error correction (FEC) applied for PUSCH in LTE is a rate-⅓ turbo code. Thus the outputs of the FEC process are a stream of systematic bits (corresponding to the TB data for uplink) and two corresponding streams of parity bits. These three streams are individually interleaved and combined to form coded data for a buffer from which the RVs are drawn. The interleaved systematic bits are laid down first, followed by alternating bits from the two parity streams. This process is schematically illustrated in FIG. 4. Working down from the top, FIG. 4 begins with the transport block plus cyclic redundancy check bits (TB+CRC). This is turbo encoded to provide the systematic bits S and the two streams of parity bits P1 and P2. The streams are individually interleaved to generate respective interleaved versions of S, P1 and P2 which are arranged in a buffer associated with the HARQ process responsible for that particular TB in the order discussed above.

The RVs for uplink transmission are created by reading bits out of the buffer from different starting points depending on the RV being used, as schematically indicated in FIG. 4. The number of bits read out for each RV depends on current rate matching and MCS conditions. When the end of the buffer is reached, readout wraps around to the beginning (i.e. it is a 'circular buffer'). The start point for RV number n is approximately n/4 along the length of the of the buffer from the start plus a fixed offset.

The above description of conventional HARQ operation is primarily focused on an LTE network operating in a frequency division duplex (FDD) mode. HARQ operation for an LTE network operating in a time division duplex (TDD) mode follows boarding the same principles, but with differences in timings associated with the variable arrangement of uplink-only and downlink-only subframes. The HARQ timeline for TDD is altered compared to FDD such that the ACK/NACK signalling arrives, as a general principle, either four subframes after the corresponding UL transmission or at a delay close to four subframes, depending on the uplink/downlink configuration. A similar alteration is made for the timing of retransmissions following receipt of NACK signalling. To make efficient use of resources, the specified number of uplink HARQ processes is different for different uplink/downlink configurations.

For TTI bundling, a bundle size of four TTIs is used for TDD, as with FDD. However none of the available uplink/downlink configurations in current versions of LTE specifications have four consecutive uplink subframes. This means for the set of TDD configurations which support TTI bundling, the four-TTI bundles are not necessarily contiguous in time. Similar rearrangements to the timeline are made with TTI bundling as for normal (non-bundled) TDD HARQ operation.

More details on HARQ operation and the associated aspects of conventional wireless telecommunications systems can be found in the relevant standards.

A drawback with conventional non-bundled HARQ processes is that when channel conditions are relatively poor such that multiple RVs are typically required to correctly decode a TB, there is a delay of eight subframes between respective RV transmissions, which increases latency. TTI bundling, on the other hand, can provide for rapid incremental combining of the four RVs derived from a TB with potential Chase combining with retransmission(s) of complete bundles as necessary. This works well in circumstances where channel conditions are such that three or four RVs are typically required to correctly decode a TB because the complete set of RVs is transmitted without the delays associated with non-bundled HARQ operation. However, TTI-bundled HARQ processes suffer similar drawbacks where it might not be possible to reliably decode a transport block from a first set of RVs such that Chase combining is typically required. In these circumstances there is a delay of 16 subframes between complete transmissions of the bundled RVs. Furthermore, to implement Chase combining the base station must store the first bundle transmission for 16 subframes, potentially for each of the four parallel HARQ processes. This can introduce a potentially significant buffering requirement at the base station (particularly for high data rates and large transport block sizes) which would apply in each group of resource blocks the eNB is scheduling, and can in some circumstances re-introduce latency that TTI bundling is intended to remove.

The 3GPP Technical Document (TDoc) R1-080443 from 3GPP TSG-RAN WG1 #51-bis Sevilla, Spain, Jan. 14-18, 2008 [3] proposes two ways of arranging HARQ processes such that only one ACK/NACK is sent per TTI bundle, namely with the timeline based on either the first or last subframe of a bundle. This approach uses a different HARQ process in each subframe, splitting the transport block over them in that way. The transmissions are controlled by higher-layer signalling (discussed in more detail in the 3GPP TDoc R2-074889 from 3GPP TSG-RAN WG2 #60 Jeju, Korea, Nov. 5-9, 2007 [4].

The 3GPP TDoc R2-074940 from 3GPP TSG-RAN WG2 #60 Jeju, Korea, Nov. 5-9, 2007 [5] discusses a form of TTI bundling that is close to what was selected for LTE.

In view of the above-identified drawbacks of existing schemes, there is therefore a need for alternative approaches for operating retransmission protocols in wireless communications networks.

SUMMARY OF THE INVENTION

According to a first aspect of the invention there is provided a method of operating a terminal device for controlling the communication of a data block from the terminal device to a base station in a wireless telecommunications system supporting multiple parallel retransmission protocol processes, the method comprising; making a first transmission of data for the data block in association with a first retransmission protocol process and obtaining corresponding first response signalling for indicating whether the data block has been successfully communicated to the base station in response thereto; making a second transmission of data for the data block in association with a second retransmission protocol process and obtaining corresponding second response signalling in response thereto, wherein the second transmission is initiated before the first response signalling is obtained, and wherein the method further comprises: determining whether to avoid retransmission of data for the data block in association with the first retransmission protocol process by taking account of both the first response signalling and the second response signalling.

In accordance with some embodiments determining whether to avoid retransmission of data for the data block in association with the first retransmission protocol process by taking account of both the first response signalling and the second response signalling comprises avoiding retransmission of data for the data block in association with the first retransmission protocol process if either one of the first response signalling or the second response signalling indicates the data block has been successfully communicated to the base station.

In accordance with some embodiments an uplink radio frame structure for the wireless telecommunications system comprises a series of transmission time intervals, TTIs, and the first and second transmissions of data for the data block comprise transmissions in respective single TTIs.

In accordance with some embodiments an uplink radio frame structure for the wireless telecommunications system comprises a series of transmission time intervals, TTIs, and the first and second transmissions of data for the data block comprise transmissions in respective bundles of TTIs.

In accordance with some embodiments the respective transmissions in different TTIs of a bundle of TTIs comprise transmissions of different bits for the data block.

In accordance with some embodiments the different bits for the data block transmitted in the different TTIs of a bundle of TTIs comprise different redundancy versions derived for the data block.

In accordance with some embodiments the first and second transmissions of data for the data block comprise transmissions of the same bits for the data block.

In accordance with some embodiments the first and second transmissions of data for the data block comprise transmissions of different bits for the data block.

In accordance with some embodiments the different bits for the data block transmitted in the first and second transmissions of data for the data block comprise different redundancy versions derived for the data block.

In accordance with some embodiments the method comprises making a further transmission of data for the data block in association with a further retransmission protocol process and obtaining corresponding further response signalling in response thereto.

In accordance with some embodiments the further transmission is initiated before the second response signalling is obtained, and the method further comprises determining whether to avoid retransmission of data for the data block in association with the first and second retransmission protocol processes by taking account of the first response signalling, the second response signalling and the further response signalling.

In accordance with some embodiments determining whether to avoid retransmission of data for the data block in association with the first and second retransmission protocol processes by taking account of the first response signalling, the second response signalling and the further response signalling comprises avoiding retransmission of data for the data block in association with the first and the second retransmission protocol processes if any of the first response signalling or the second response signalling or the further response signalling indicates the data block has been successfully communicated to the base station.

In accordance with some embodiments the further transmission of data for the data block in association with the further retransmission protocol process is made before the first transmission of data for the data block in association with the first retransmission protocol process, and wherein the method comprises avoiding retransmission of data for the data block in association with the further retransmission protocol process if either of the first response signalling or the second response signalling indicates the data block has been successfully communicated to the base station.

In accordance with some embodiments the method comprises avoiding retransmission of data for the data block in association with the second retransmission protocol process if the first response signalling indicates the data block has been successfully communicated to the base station.

In accordance with some embodiments the method comprises the terminal device deriving information from the second response signalling which is different from information indicating whether the data block has been successfully communicated to the base station in the event the first response signalling already indicates the data block has been successfully communicated to the base station.

In accordance with some embodiments the information comprises an indication that the terminal device should modify one or more parameters associated with subsequent transmissions of data to the base station.

In accordance with some embodiments the one or more parameters relates to one or more elements from the group comprising: a modulation coding scheme, a selection of bits for transmission from a data block, an instruction to transmit a reduced amount of data for a data block, and an instruction to transmit data from multiple data blocks in associated with a single protocol transmission process.

In accordance with some embodiments the method comprises making a first transmission of data from a different data block in association with a third retransmission protocol process and obtaining corresponding third response signalling for indicating whether the different data block has been successfully communicated to the base station in response thereto; making a second transmission of data from the different data block in association with a fourth retransmission protocol process and obtaining corresponding fourth response signalling in response thereto, wherein the second transmission of data from the different data block is initiated before the third response signalling is obtained, and the method further comprises determining whether to avoid retransmission of data for the data block in association with the third retransmission protocol process by taking account of both the third response signalling and the fourth response signalling, and wherein the third and fourth retransmission protocol processes operate in parallel with the first and second retransmission protocol processes.

In accordance with some embodiments the method comprises determining whether the data block has been successfully communicated to the base station by taking account of a combination of the first response signalling and the second response signalling.

In accordance with some embodiments the method comprises transmitting data for the data block and data from another data block in association with a single retransmission protocol process.

In accordance with some embodiments the response signalling is obtained from signalling on a physical retransmission protocol indicator channel transmitted by the base station.

In accordance with some embodiments the response signalling is obtained from signalling in downlink control information transmitted by the base station.

In accordance with some embodiments the respective retransmission protocol processes are hybrid automatic repeat request (HARQ) processes.

According to second aspect of the invention there is provided a terminal device for controlling the communication of a data block from the terminal device to a base station in a wireless telecommunications system supporting multiple parallel retransmission protocol processes, the terminal device comprising; a transceiver unit operable to make a first transmission of data for the data block in association with a first retransmission protocol process and obtain corresponding first response signalling for indicating whether the data block has been successfully communicated to the base station in response thereto; and to make a second transmission of data for the data block in association with a second retransmission protocol process and obtain corresponding second response signalling in response thereto, wherein the second transmission is initiated before the first response signalling is obtained; and a controller unit operable to determine whether to avoid retransmission of data for the data block in association with the first retransmission protocol process by taking account of both the first response signalling and the second response signalling.

In accordance with some embodiments the controller unit is operable to determine whether the data block has been successfully communicated to the base station by taking account of a combination of the first response signalling and the second response signalling.

According to third aspect of the invention there is provided a wireless telecommunications system comprising the terminal device of the second aspect of the invention and a base station.

According to fourth aspect of the invention there is provided a method of operating a base station for controlling the communication of a data block from a terminal device to the base station in a wireless telecommunications system supporting multiple parallel retransmission protocol processes, the method comprising; receiving from the terminal device a first transmission of data for the data block in association with a first retransmission protocol process and transmitting to the terminal device corresponding first response signalling for indicating whether the data block has been successfully received in response thereto; receiving from the terminal device a second transmission of data for the data block in association with a second retransmission protocol process and transmitting to the terminal device corresponding second response signalling in response thereto, wherein receiving the second transmission begins before the first response signalling is transmitted, and wherein the method further comprises: determining whether to avoid scheduling for a retransmission of data for the data block from the terminal device in association with the first retransmission protocol process by taking account of whether or not the data block has been successfully received by the base station in association with the second retransmission protocol process.

In accordance with some embodiments determining whether to avoiding scheduling for a retransmission of data for the data block from the terminal device in association with the first retransmission protocol process by taking account of whether or not the data block has been successfully received by the base station in association with the second retransmission protocol process comprises avoiding scheduling for a retransmission of data for the data block from the terminal device in association with the first retransmission protocol if either of the first response signalling or the second response signalling indicates the data block has been successfully received by the base station.

In accordance with some embodiments an uplink radio frame structure for the wireless telecommunications system comprises a series of transmission time intervals, TTIs, and the first and second transmissions of data for the data block comprise transmissions in respective single TTIs.

In accordance with some embodiments an uplink radio frame structure for the wireless telecommunications system comprises a series of transmission time intervals, TTIs, and the first and second transmissions of data for the data block comprise transmissions in respective bundles of TTIs.

In accordance with some embodiments the respective transmissions in different TTIs of a bundle of TTIs comprise transmissions of different bits for the data block.

In accordance with some embodiments the different bits for the data block transmitted in the different TTIs of a bundle of TTIs comprise different redundancy versions derived for the data block.

In accordance with some embodiments the first and second transmissions of data for the data block comprise transmissions of the same bits for the data block.

In accordance with some embodiments the first and second transmissions of data for the data block comprise transmissions of different bits for the data block.

In accordance with some embodiments the different bits for the data block transmitted in the first and second transmissions of data for the data block comprise different redundancy versions derived for the data block.

In accordance with some embodiments the method comprises receiving from the terminal device a further transmission of data for the data block in association with a further retransmission protocol process and transmitting to the terminal device corresponding further response signalling in response thereto.

In accordance with some embodiments reception of the further transmission begins before the second response signalling is transmitted to the terminal device, and the method further comprises determining whether to avoid scheduling for a retransmission of data for the data block from the terminal device in association with the first and the second retransmission protocol processes by taking account of whether or not the data block has been successfully received by the base station in association with the further retransmission protocol process.

In accordance with some embodiments determining whether to avoid scheduling for a retransmission of data for the data block from the terminal device in association with the first and the second retransmission protocol processes by taking account of whether or not the data block has been successfully received by the base station in association with the further retransmission protocol process comprises avoiding scheduling for a retransmission of data for the data block from the terminal device in association with the first and the second retransmission protocol processes if any of the first response signalling or the second response signalling or the further acknowledgement indicates the data block has been successfully received by the base station.

In accordance with some embodiments the further transmission of data for the data block in association with the further retransmission protocol process is received before the first transmission of data for the data block in association with the first retransmission protocol process, and wherein the method further comprises avoiding scheduling for a retransmission of data for the data block from the terminal device in association with the further retransmission protocol process if either of the first response signalling or the second response signalling indicates the data block has been successfully received by the base station.

In accordance with some embodiments the method comprises avoiding scheduling for a retransmission of data for the data block from the terminal device in association with the second retransmission protocol process if the first response signalling indicates the data block has been successfully communicated to the base station.

In accordance with some embodiments the method comprises conveying to the terminal device information using the second response signalling which is different from information indicating whether the data block has been successfully received by the base station in the event the first response signalling already indicates the data block has been successfully received by the base station.

In accordance with some embodiments the information comprises an indication that the terminal device should modify one or more parameters associated with subsequent transmissions of data to the base station.

In accordance with some embodiments the one or more parameters relates to one or more elements from the group comprising: a modulation coding scheme, a selection of bits for transmission from a data block, an instruction to transmit a reduced amount of data for a data block, and an instruction to transmit data from multiple data blocks in associated with a single protocol transmission process.

In accordance with some embodiments the method comprises receiving from the terminal device a first transmission of data from a different data block in association with a third retransmission protocol process and transmitting to the terminal device corresponding third response signalling for indicating whether the different data block has been successfully communicated to the base station in response thereto; receiving from the terminal device a second transmission of data from the different data block in association with a fourth retransmission protocol process and transmitting to the terminal device corresponding fourth response signalling in response thereto, wherein reception of the second transmission of data from the different data block begins before the third response signalling is transmitted, and the method further comprises determining whether to avoid scheduling for a retransmission of data for the data block from the terminal device in association with the third retransmission protocol process by taking account of whether or not the data block has been successfully received by the base station in association with the fourth retransmission protocol process, and wherein the third and fourth retransmission protocol processes operate in parallel with the first and second retransmission protocol processes.

In accordance with some embodiments the method comprises suppressing transmission of the second response signalling if the first response signalling indicates the data block has been successfully received by the base station.

In accordance with some embodiments the method comprises receiving data for the data block and data from another data block in association with a single retransmission protocol process.

In accordance with some embodiments the response signalling is transmitted on a physical retransmission protocol indicator channel.

In accordance with some embodiments the response signalling is transmitted in downlink control information.

In accordance with some embodiments the respective retransmission protocol processes are hybrid automatic repeat request (HARQ) processes.

According to a fifth aspect of the invention there is provided a base station for controlling the communication of a data block from a terminal device to the base station in a wireless telecommunications system supporting multiple parallel retransmission protocol processes, the base station comprising; a transceiver unit operable to receive from the terminal device a first transmission of data for the data block in association with a first retransmission protocol process and transmit to the terminal device corresponding first response signalling for indicating whether the data block has been successfully received in response thereto; and receive from the terminal device a second transmission of data for the data block in association with a second retransmission protocol process and transmit to the terminal device corresponding second response signalling in response thereto, such that reception of the second transmission begins before the first response signalling is transmitted, and wherein the base station further comprises: a controller unit operable to determine whether to avoid scheduling for a retransmission of data for the data block from the terminal device in association with the first retransmission protocol process by taking account of whether or not the data block has been successfully received by the base station in association with the second retransmission protocol process.

In accordance with some embodiments the transceiver unit is operable to suppress transmission of the second response signalling if the first response signalling indicates the data block has been successfully received by the base station.

According to a sixth aspect of the invention there is provided a wireless telecommunications system comprising the base station of the fifth aspect of the invention and a terminal device.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 5:
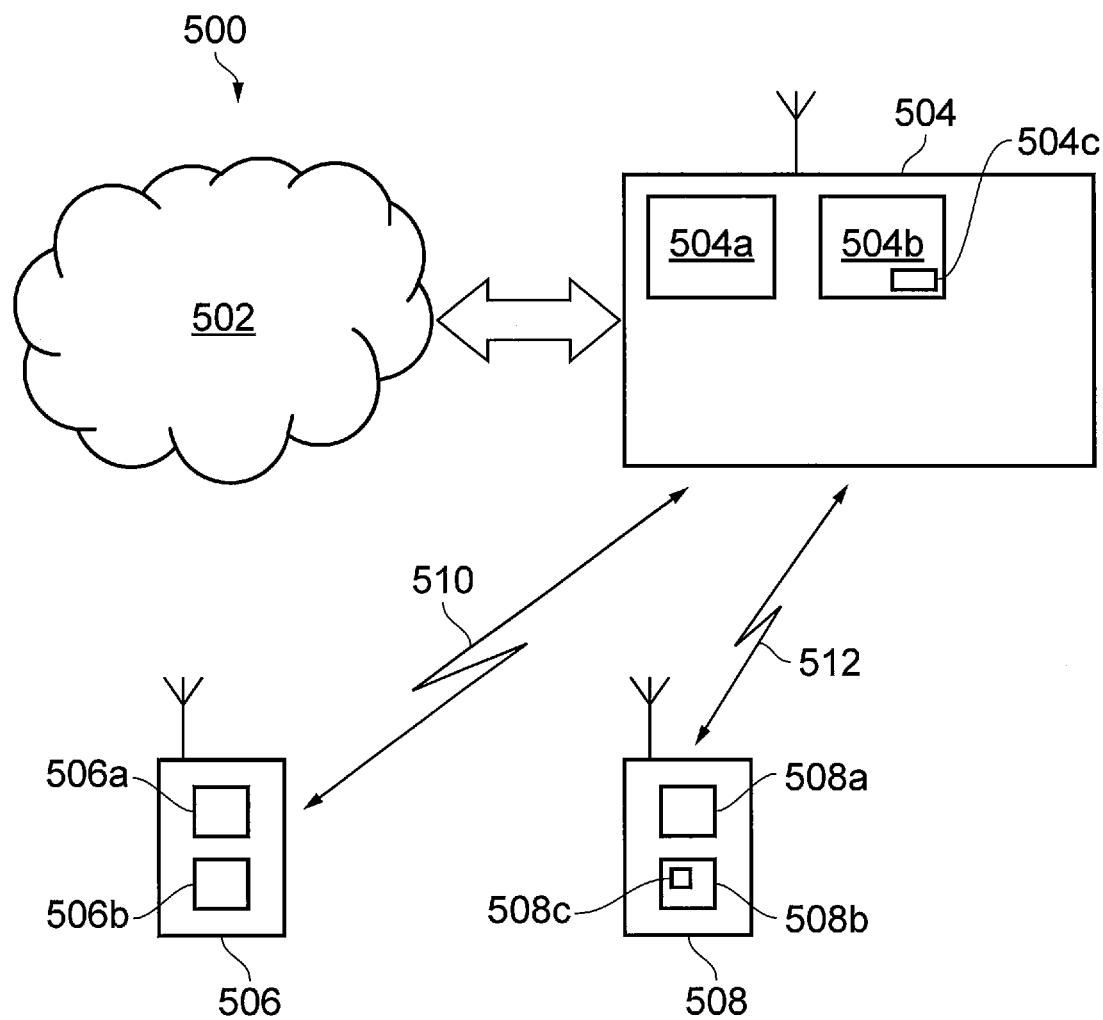
FIG. 5 schematically represents an example of an LTE-type mobile telecommunication network according to an embodiment of the invention.

FIG. 5 schematically shows a telecommunications system 500 according to an embodiment of the invention. The telecommunications system 500 in this example is based broadly on an LTE-type architecture. As such many aspects of the operation of the telecommunications system 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 adapted in accordance with an embodiment of the invention and arranged to communicate with a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the invention as discussed herein.

In this example, it is assumed the first terminal device 506 is a conventional terminal device communicating with the base station 504 in a conventional manner. This conventional terminal device 506 comprises a transceiver unit 506a for transmission and reception of wireless signals and a controller unit 506b configured to control the device 506. The controller unit 506b may comprise a processor unit which is suitably configured/programmed to provide the desired functionality using conventional programming/configuration techniques for equipment in wireless telecommunications systems. The transceiver unit 506a and the controller unit 506b are schematically shown in FIG. 5 as separate elements. However, it will be appreciated that the functionality of these units can be provided in various different ways, for example using a single suitably programmed integrated circuit. As will be appreciated the second terminal device 506 will in general comprise various other elements associated with its operating functionality. For example, the terminal device 506 will also include a HARQ entity providing HARQ functions such as described above.

In this example, it is assumed the second terminal device 508 is a terminal device adapted to support operation in accordance with embodiments of the invention when communicating with the base station 504.

As with the conventional terminal device 506, the terminal device 508 according to an embodiment of the invention comprises a transceiver unit 508a for transmission and reception of wireless signals and a controller unit 508b configured to control the device 508. The controller unit 508b may comprise various sub-units for providing functionality in accordance with embodiments of the invention as explained further below. These sub units may be implemented as discrete hardware elements or as appropriately configured functions of the controller unit. Thus the controller unit 508b may comprise a processor unit which is suitably configured/programmed to provide the desired functionality described herein using conventional programming/configuration techniques for equipment in wireless telecommunications systems. The transceiver unit 508a and the controller unit 508b are schematically shown in FIG. 5 as separate elements for ease of representation. However, it will be appreciated that the functionality of these units can be provided in various different ways following established practices in the art, for example using a single suitably programmed integrated circuit. It will be appreciated the terminal device 508 will in general comprise various other elements associated with its operating functionality. In particular, the terminal device 508 includes a HARQ entity 508c for providing HARQ functionality in respect of uplink transmission in accordance with embodiments of the invention. In this example the terminal device HARQ entity (unit) 508c is schematically shown as a sub-unit of the controller unit 508b.

The base station 504 comprises a transceiver unit 504a for transmission and reception of wireless signals and a controller unit 504b configured to control the base station 504. The controller unit 504b may again comprise various sub-units, such as a scheduling unit for providing functionality in accordance with embodiments of the invention as explained further below. These sub units may be implemented as discrete hardware elements or as appropriately configured functions of the controller unit. Thus, the controller unit 504b may comprise a processor unit which is suitably configured/programmed to provide the desired functionality described herein using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways following established practices in the art, for example using a single suitably programmed integrated circuit. It will be appreciated the base station 504 will in general comprise various other elements associated with its operating functionality. In particular, the base station 504 includes a HARQ entity 504c for providing HARQ functionality in respect of uplink transmission in accordance with embodiments of the invention. In this example the base station HARQ entity (unit) 504c is schematically shown as a sub-unit of the controller unit 504b.

Thus, the base station 504 is configured to communicate data with both the conventional terminal device 506 and the terminal device 508 according to an embodiment of the invention over respective communication links 510, 512. It is assumed here the base station 504 is configured to communicate with the conventional terminal device 506 over the associated radio communication link 510 in accordance with the established principles of LTE-based communications. However, communications between the base station 504 and the terminal device 508 operate using different retransmission protocol procedures according to an embodiment of the invention as described further below.

The following example embodiments of the invention are described primarily in the context of multiple HARQ processes associated with a single terminal device, such as the terminal device 508 represented in FIG. 5, operating in an FDD communication mode. It will be appreciated, however, that similar principles can be implemented in other circumstances. For example, a terminal device may equally implement HARQ procedures in accordance with embodiments of the invention when operating in a TDD mode with appropriate adjustments to timelines corresponding to those employed for conventional HARQ processes in TDD, as opposed to FDD, operation.

In accordance with a first embodiment of the invention a terminal device and a base station, such as the terminal device 508 and base station 504 shown in FIG. 5, are configured to adopt modified HARQ procedures. In particular, data associated with a given transport block (TB) is assigned in the terminal device to more than one HARQ process. In this first embodiment it is assumed communications from the terminal device employ the general principles of TTI-bundling as discussed above. That is to say, it is assumed the terminal device is operating to transmit respective groups of four redundancy versions associated with transport blocks for uplink communication with a retransmission protocol for each group being governed by a single HARQ process. An aspect of this embodiment of the invention is that the terminal device is configured to make (at least) two transmissions of data for the transport blocks under the respective control of (at least) two separate retransmission protocol processes, which in this case are HARQ processes. Significantly, in accordance with this embodiment, a second transmission of data for the transport block is made before receipt of acknowledgement signalling associated with a previous first transmission of data for the transport block. Furthermore, in accordance with this embodiment, retransmission of data for the transport block under the control of the first HARQ process is prevented if acknowledgement signalling associated with either one of the first or second HARQ process indicates the transport block has been successfully communicated to the base station. Similarly, retransmission of data for the transport block under control of the second HARQ process is prevented if either one of the first or second HARQ process indicates successful communication of the transport block. In some respects, this embodiment of the invention may be characterised by the provision of multiple HARQ processes operating in parallel for corresponding multiple transmissions of the same transport block and wherein retransmission attempts for one HARQ process are controlled by taking account of acknowledgement signalling associated with another HARQ process.

Figure 6:
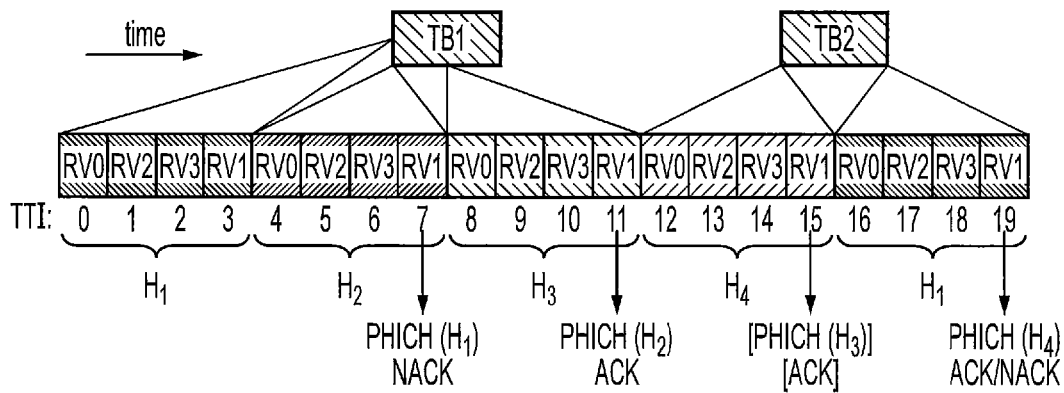
FIGS. 6 to 12 schematically represent transmissions and timings associated with HARQ operating in accordance with various embodiments of the invention.

FIG. 6 schematically represents an example operation for a retransmission protocol in an LTE-based communications network in accordance with an embodiment of the invention. FIG. 6 is in some respects similar to FIG. 3 and schematically shows a series of TTIs associated with TTI-bundled uplink telecommunications from a terminal device supporting HARQ procedures in accordance with an embodiment of the invention. FIG. 6 also provides an indication of which TTIs are associated with which of four parallel HARQ procedures (H1, H2, H3, H4) and which data are being transmitted in each TTI (i.e. which redundancy version from which transport block) in accordance with an embodiment of the invention. For ease of explanation and reference the TTIs are sequentially numbered 0, 1, 2 . . . and so on in FIG. 6 with increasing time relative to the first TTI shown in the figure.

Figure 1:
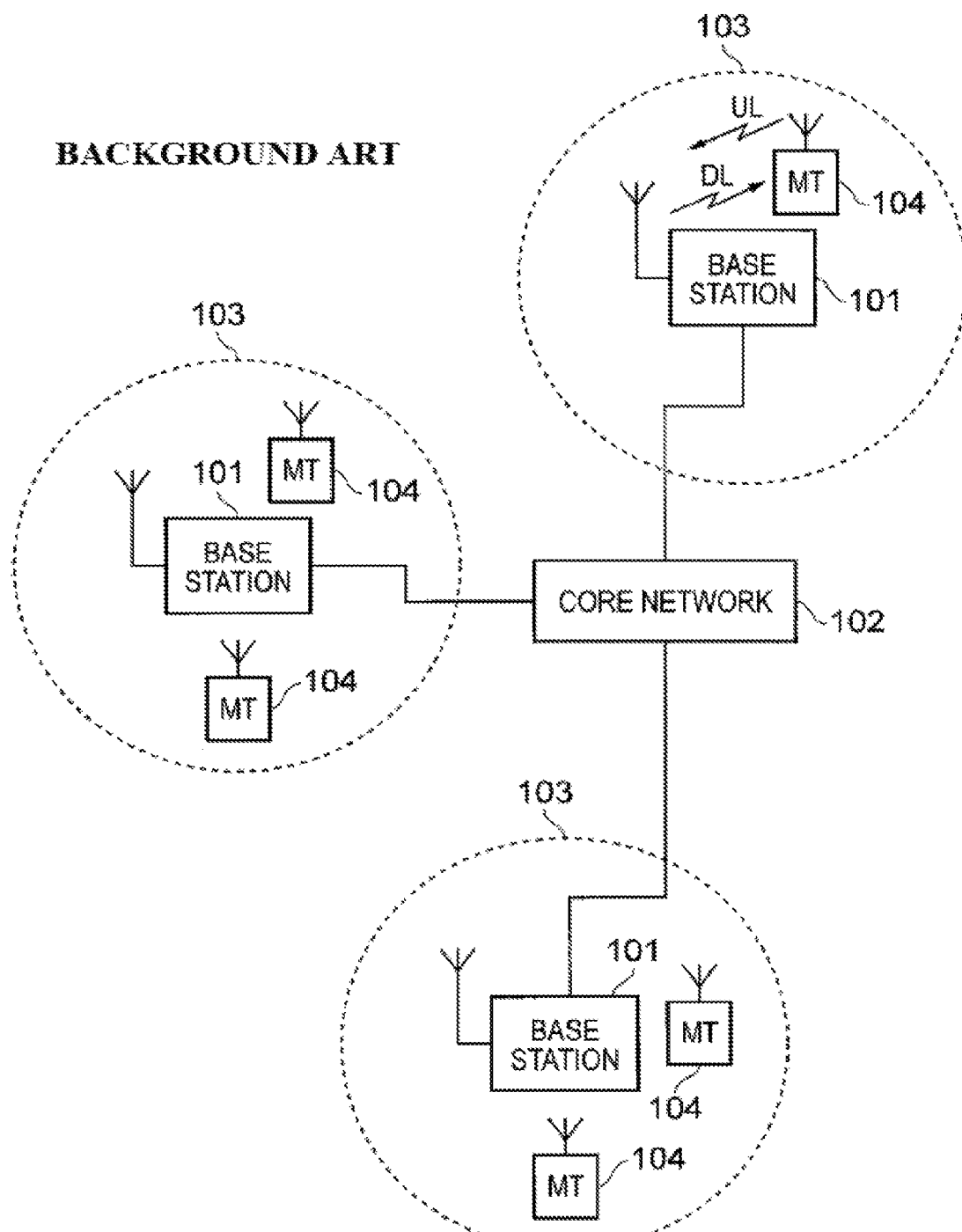
FIG. 1 schematically represents an example of a conventional LTE-type mobile telecommunication network.
Figure 2:
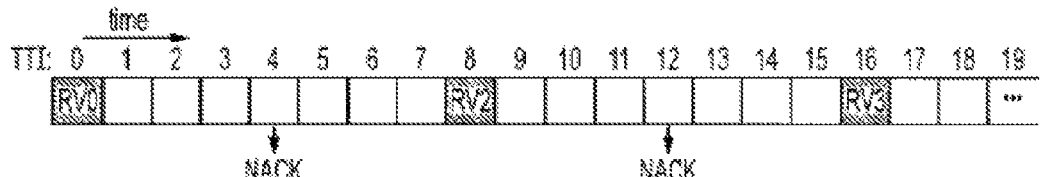
FIG. 2 schematically represents the transmissions and timings associated of a conventional non-TTI-bundle HARQ process in an LTE-type network.
Figure 3:
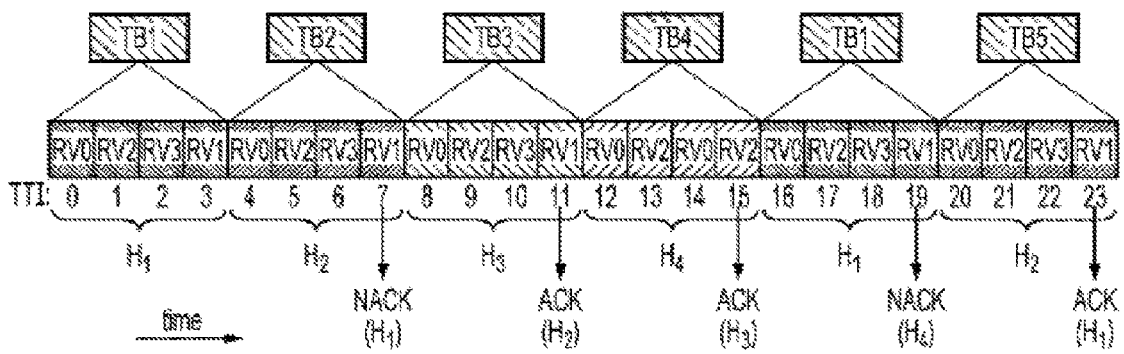
FIG. 3 schematically represents the transmissions and timings associated with four conventional TTI-bundled HARQ processes in an LTE-type network.

Thus, in accordance with an embodiment of the invention the terminal device is configured such that a first transport block, TB1, is first transmitted using conventional TTI bundling techniques in TTIs 0 to 3 under control of a first HARQ process H1. In this example redundancy versions associated with the first transport block, TB1, are transmitted in the order RV0-RV2-RV3-RV1 in the first four TTIs assigned to the first HARQ process H1. In accordance with the embodiment of FIG. 6, it is assumed the first HARQ process H1 is configured to expect to receive ACK/NACK signalling from the base station in TTI 7 (i.e. following the same basic timing as for conventional TTI-bundled HARQ operation as represented in FIG. 3). Furthermore, it is assumed for this embodiment the first HARQ process H1 is configured to make any required retransmissions as another bundle starting in the 13th TTI after transmission of the last RV of the previous attempt (i.e. again following the same basic timing as for conventional TTI-bundled HARQ operation as represented in FIG. 3 in this respect).

However, as represented in FIG. 6, operation in accordance with an embodiment of the invention departs significantly from conventional HARQ operation in that TTI-bundled data associated with the first transport block TB1 is transmitted a second time in TTIs 4 to 7 under control of a second HARQ process H2. This second transmission under control of the second HARQ process H2 may in some respects be considered a speculative transmission in that it is initiated before acknowledgement signalling associated with the first transmission operating under control of the first HARQ process H1 is received. This means the second transmission of the first transport block TB1 might represent a waste of resources if in fact the first transport block is successfully communicated to the base station in its first transmission under control of the first HARQ process H1 in TTIs 0 to 3.

However, for the example operation represented in FIG. 6 it is assumed the base station is not able to correctly decode TB1 from its first transmission under control of the first HARQ process H1 in TTIs 0 to 3. Accordingly, the terminal device receives acknowledgement signalling (feedback/response signalling) in TTI 7 indicating a non-acknowledgement of the TTI bundle transmitted under control of HARQ process H1. This is schematically indicated in FIG. 6 by NACK labelling in association the relevant TTI. It is assumed in this example the acknowledgement signalling (ACK/NACK indicators) are communicated from the base station to the terminal device in accordance with broadly conventional techniques, for example using PHICH or DCI signalling as discussed above. For the purposes of this example it will be assumed ACK/NACK signalling is received on PHICH.

On receipt of NACK signalling in TTI 7 the first HARQ process H1 is configured to retain data associated with TB1 for potential retransmission on the next TTIs under control of the first HARQ process H1, namely TTIs 16 to 19. Again, this timing broadly follows the timings associated with retransmission protocols of conventional TTI-bundled HARQ operation.

In response to the receipt of NACK signalling in TTI 7, the terminal device operating HARQ procedures in accordance with this embodiment of the invention is configured such that TTI-bundled data associated with the first transport block TB1 is transmitted for a third time in TTIs 8 to 11 under control of a third HARQ process H3. This third transmission under control of the third HARQ process H3 may again be considered a speculative transmission in that it is initiated before receipt of acknowledgement signalling associated with a previous transmission of data for the transport block that might allow the base station to decode the transport block without requiring additional data from the third transmission.

Having failed to correctly decode TB1 from the first transmission associated with HARQ process H1 in this example, the base station receives the second transmission of the first transport block TB1 in TTIs 4 to 7 and attempts to decode the first transport block TB1 by taking account of signals received in association with both the first and second transmissions of TB1. This can be achieved, for example, by conventional Chase combining of the received signals for the second TB1 transmission made in association with the second HARQ process H2 with the received signals for the first TB1 transmission of the TTIs 0 to 3 (which on their own could not be correctly decoded, hence the NACK in TTI 7). The ability to chase combine the two received versions of TB1 increases the likelihood of success for decoding, and in this example it is assumed TB1 is successfully decoded as a result of this combining. Consequently the terminal device receives acknowledgement signalling (response signalling) transmitted by the base station in association with HARQ process H2 in TTI 11 indicating TB1 has been successfully decoded at the base station. This is schematically indicated in FIG. 6 by ACK labelling in association with the relevant TTI. As noted above, it is assumed in this example the acknowledgement signalling (ACK/NACK indicators) are communicated from the base station to the terminal device in accordance with broadly conventional techniques.

On receiving the ACK in TTI 11 the corresponding HARQ process H2 recognises there is no need to schedule its own retransmission at a later time in accordance with similar principles to those underlying conventional HARQ operation. However, a significant aspect of this embodiment of the invention is that the first HARQ process H1 is also configured to also take account of the ACK signalling received in TTI 11 in association with the second HARQ process H2 and to cancel its own planned retransmission of TB1 in TTIs 16 to 19. The scheduling unit in the base station is aware that the terminal device will react in this way and correspondingly avoids scheduling for a retransmission of the transport block associated with HARQ process H1 as a consequence of having sent the positive acknowledgement in association with HARQ process H2. That is to say, the base station avoids scheduling for a retransmission associated with HARQ process H1 based on acknowledgment signalling provided in association with a different HARQ process (in this example HARQ process H2). This may be done by not reserving/allocating (or cancelling an existing reservation/allocation of) resources for such a retransmission. Instead the resources may be allocated for uplink communication of a different transport block from the terminal device, or for use by another terminal device in the network.

In this example the third transmission of the first transport block TB1 sent under control of the third HARQ process H3 in TTIs 8 to 11 is not needed by the base station to correctly decode TB1. In some respects this uplink transmission may thus be considered to have been a waste of uplink resources. Accordingly, the base station is configured to not request any retransmission of the data transmitted in association with the third HARQ process regardless of how corrupted it might have been received. That is to say, the base station in this example is configured to never send negative acknowledgement signalling (NACK) in response to data associated with a transport block that has previously been successfully decoded. However, in exchange for this potentially wasted resource is provided the ability for the base station to potentially decode the uplink data more quickly than with conventional HARQ techniques when more than one uplink transmission is required. In this regard the third HARQ process H3 may be configured to ignore the associated ACK/NACK signalling received in TTI 15 in so far as governing whether retransmissions are required, and instead always assume an ACK. However, as discussed further below, the ACK/NACK signalling resources associated with unnecessary uplink transmissions, such as the third transmission of TB1 in this example, may be used for other purposes in accordance with some embodiments of the invention.

Having received the indication in TTI 11 that TB1 has now been successfully communicated to the base station, the terminal device (more specifically the HARQ entity of the terminal device) is configured to begin uplink transmission of the next transport block, TB2, starting from the next available TTI (here TTI 12) under control of the next available HARQ process (here HARQ process H4). Thus, uplink transmission for TB2 may proceed in the same manner as discussed above for TB1 with a first transmission in TTIs 12 to 15 under control of HARQ process H4 followed by a second "speculative" transmission under control of the next HARQ process, in this case HARQ process H1, in TTIs 16 to 19, and so on.

Figure 7:
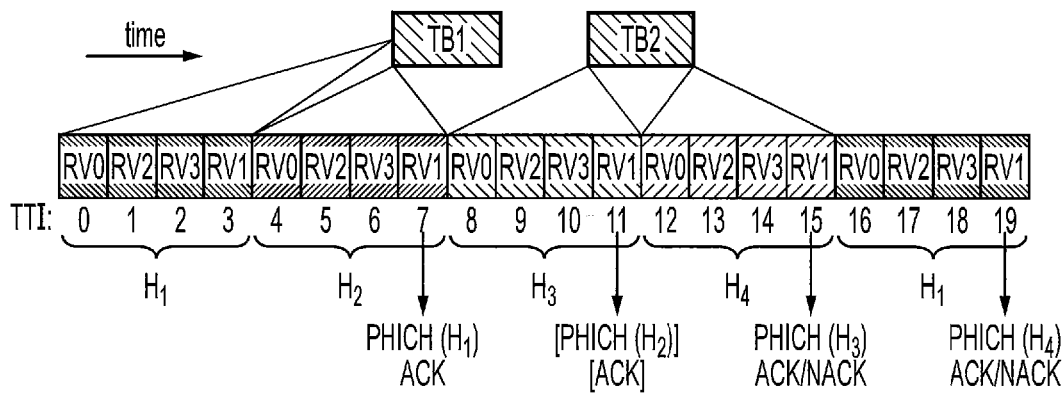

FIG. 7 is similar to, and will be understood from, FIG. 6, but represents what happens in accordance with this embodiment of the invention if the base station is able to correctly decode the transport block TB1 from the first transmission associated with the first HARQ process H1. If the base station is able to decode TB1 from the first transmission on TTIs 0 to 3, the terminal device obtains a corresponding ACK indication on TTI 7 in accordance with the above-described techniques. Because the base station has been able to decode TB1 from the first transmission, the second transmission of data from TB1 made in association with the second HARQ process H2 on TTIs 4 to 7 is not needed by the base station. In a manner similar to that described above with reference to FIG. 6 for the acknowledgement signalling associated with third HARQ process H3 in TTI 15, the acknowledgement signalling in TTI 11 associated with the second HARQ process in FIG. 7 is not needed by the terminal device. This is because the terminal device already knows from the previous positive acknowledgement signalling in TTI 7 that the relevant transport block has been successfully received by the base station.

To avoid potential confusion arising from the unneeded acknowledgement signalling it may be appropriate for a HARQ process associated with uplink of a given transport block to be configured to ignore whatever acknowledgement signalling is received for that HARQ process if positive acknowledgement has already been received by another HARQ process for the same transport block. In particular, the HARQ process associated with a transport block that has already been positively acknowledged by the base station in response to an earlier transmission may be configured to automatically assume positive acknowledgement (ACK) signalling in respect of its own transmission. This is to avoid the HARQ process scheduling an unnecessary retransmission if for some reason positive downlink acknowledgement signalling sent from the base station in association with the later HARQ process is corrupted in transmission or not received. Where a HARQ process is configured to ignore its own acknowledgement signalling in this way by automatically assuming a positive acknowledgement based on a previous positive acknowledgement for the same transport block transmitted in association with a different HARQ process, the corresponding response signalling (acknowledgement signalling) may be used to convey additional information, as discussed further below.

In response to receiving the positive acknowledgement in TTI 7 the MAC entity of the terminal device in this example is configured to avoid any further transmissions of TB1. Instead, the terminal device might begin transmitting the next transport block (TB2 in FIG. 7) in association with the next available HARQ process based on base station scheduling grants received in TTI 8 in the normal way. Alternatively, the base station may schedule the terminal device to make no further transmissions for a period during which other terminal devices in the network are allocated the available uplink resources (not shown in the figures).

In embodiments in which a terminal device is not able to respond quickly enough to the receipt of positive acknowledgement signalling in one TTI to immediately start transmitting a new transport block in the next TTI, the terminal device may instead be configured to continue with a further transmission of data for the same transport block in the TTIs following the ACK signalling. That is to say, the terminal device may initiate uplink transmissions associated with TB1 in TTI 8 under control of HARQ process H3 even after having received an ACK relating to TB1 in TTI 7. In this case the base station may be configured to simply disregard these transmissions without decoding and the acknowledgement signalling associated with this transmission may be handled in a manner similar to that described above. For example, the MAC entity in the terminal device may be configured to assume positive acknowledgement signalling (ACK) in respect of any uplink transmission of data associated with a transport block that has already been positively acknowledged regardless of what, if any, acknowledgement signalling is actually received for that transmission.

Alternatively, even if the terminal device is not able to respond fast enough to begin transmitting a new transport block, it may instead be required, for example in accordance with predefined standardisation, to make no transmissions associated with the a transport block in TTIs that immediately follow a positive acknowledgement for a previous transmission associated with that transport block. This saves power at the terminal device, and furthermore, the base station can allocate the relevant resources to another terminal device in the network.

Figure 8:
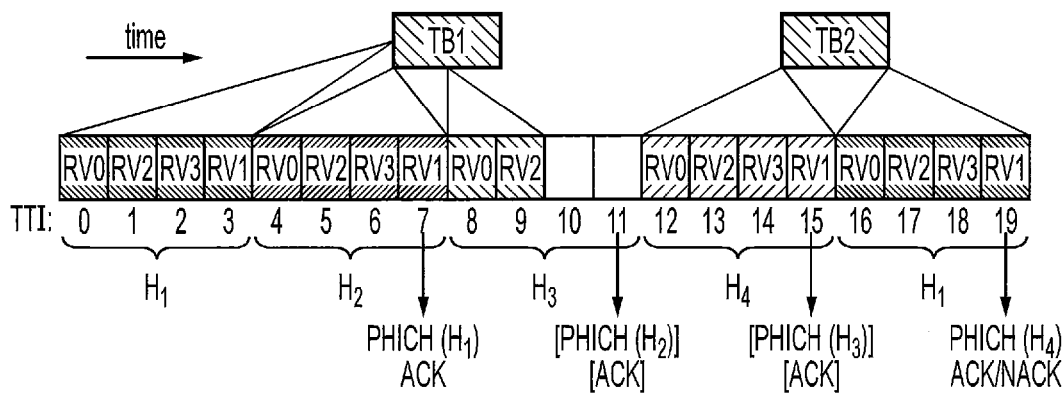

In yet another example where a terminal device is not able to respond immediately to positive acknowledgement signalling, the MAC entity may be configured to begin a further transmission of a previously-ACKed transport block, but to cease this transmission as soon as possible. This is schematically resented in FIG. 8 which is similar to, and will be understood from FIG. 7. However, in FIG. 8 it is assumed the terminal device is not able to immediately switch to transmission of TB2 following the ACK in TTI 7, and continues instead with a third transmission of TB1 in association with a third HARQ process H3. However, before completing this third transmission of all for redundancy versions, the MAC entity responds to the positive acknowledgement received in TTI 7 to recognise that the on-going transmission in association with HARQ process H3 is unnecessary, and can be stopped. In the example shown in FIG. 8, this happens after RV0 and RV2 have been in TTIs 8 and 9, leaving TTIs 10 and 11 empty of uplink transmissions.

Whilst the above embodiment has been described in the context of four parallel HARQ processes controlling uplink of TTI bundled data, embodiments of the invention can equally be applied for non-bundled HARQ processes by assigning the four RVs cyclically to the eight normal HARQ processes and allowing interruption of one HARQ process based on acknowledgement signalling associated with another HARQ process as described above.

In a variation of the above-described embodiments, in some cases not all the HARQ processes (whether bundled or not) are provided for potential redundant transmission of data associated with a single TB. For example, in a TTI-bundled implementation having four parallel HARQ processes, in some cases HARQ processes H1 and H2 may be configured to operate together in accordance with the principles described above to facilitate the uplink communication of a first transport block, whilst HARQ processes H3 and H4 may be configured to operate together but independently of HARQ processes H1 and H2 to facilitate the uplink communication of a second transport block in accordance with the principles described above. An example of this operating mode is schematically represented in FIG. 9.

Figure 9:
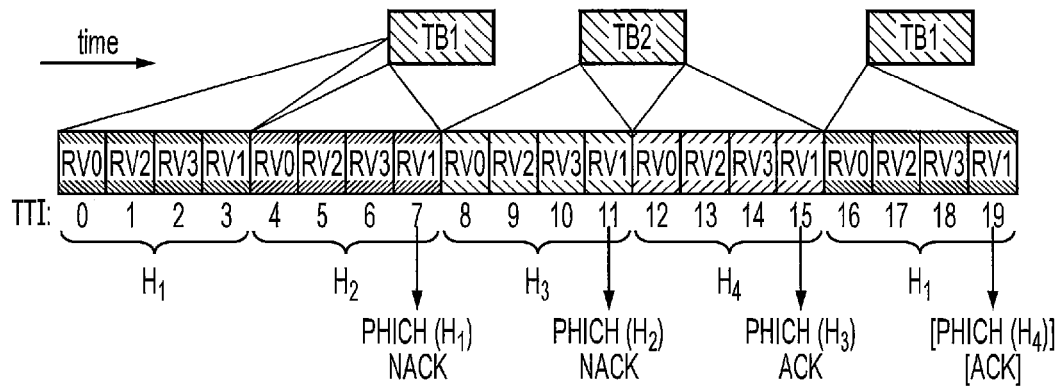

FIG. 9 shows an example in which first and second HARQ processes H1, H2 are allocated for uplink communication of a first transport block, TB1, whilst second and third HARQ processes H3, H4 are allocated for uplink communication of a second transport block, TB2. In this example it is assumed that negative acknowledgement signalling is received in TTI 7 in respect of the first HARQ process H1. However, unlike the approach adopted in the embodiment of FIG. 6, in the embodiment of FIG. 9 the MAC entity in the terminal device is configured to make a first transmission of data from TB2 in association with HARQ process H3, instead of a third transmission of data associated with TB1. If subsequent acknowledgement signalling received in TTI 11 in association with HARQ process H2 indicates the transport block TB1 has been successfully communicated to the base station, the first and second HARQ processes H1, H2 both avoid any retransmission of data associated with TB1 and can begin transmitting another transport block when they next become active. However, in the example represented in FIG. 9, it is assumed the subsequent acknowledgement signalling received in TTI 11 in association with HARQ process H2 indicates the transport block TB1 has still not been successfully communicated to the base station. In this case retransmission associated with the first HARQ processes H1 due to the NACK received in TTI 7 is not interrupted and a retransmission proceeds starting from TTI 16, as schematically shown in FIG. 9. Although not shown in the figure, HARQ process H2 will likewise retransmit data associated with TB1 in TTIs 20 to 23. In essence, the behaviour associated with TTIs 16 to 23 will repeat the behaviour associated with TTIs 0 to 7. However, there is more chance of a successful receipt of TB1 in association with these transmissions since the base station will be able to chase combine with the earlier two transmissions on TTIs 0 to 7. Repeated failures to communicate the data to the base station will result in repeated uplink transmission attempts until the data is correctly received or a threshold number of attempts are made without success. If the threshold number of failed attempts is reached, the terminal device may act in the same manner as when conventional HARQ operation fails to communicate data after a threshold number of attempts.

Thus some embodiments of the invention can involve making speculative uplink transmissions of data for a transport block before it is established whether an earlier transmission of data for the same transport block has been successfully received by the base station. Furthermore, some embodiments of the invention can involve interrupting a HARQ process associated with one transmission based on acknowledgement signalling associated with another HARQ process associated with another transmission of related data (i.e. data derived for the same transport block). As noted above this approach potentially gives rise to situations in which acknowledgement signalling associated with some uplink transmissions is not needed by the terminal device. In particular, acknowledgement signalling which follows a previous occurrence of positive acknowledgement signalling (ACK) for the same transport block is not needed. Examples of slots for acknowledgement signalling which is not strictly necessary are TTI 15 in FIG. 6, TTI 11 in FIG. 7, both TTIs 11 and 15 in FIG. 8, and TTI 19 in FIG. 9. There are a number of different ways for handling potentially unneeded acknowledgement signalling.

Referring to the timing situation represented in FIG. 7 as a specific example, in some embodiments the base station might be configured to transmit acknowledgement signalling associated with the second HARQ process H2 in TTI 11 in the normal way, even though this signalling is not strictly necessary (because the previous ACK signalling received in association with TB1 in TTI 7 means HARQ process H2 need not schedule any retransmissions regardless of whether its own transmission of TB1 was successfully received). The terminal device may then be configured to take account of the acknowledgement signalling associated with both uplink transmissions of TB1 (i.e. the acknowledgement signalling associated with both HARQ processes H1 and H2) when determining whether the TB1 has been successfully communicated to the base station. This approach provides the terminal device with the ability to redundantly detect, or Chase combine, the acknowledgement signalling associated with multiple HARQ processes, thereby allowing the terminal device to more reliably determine if an ACK has been sent. For example, if an ACK is decoded by the terminal device in TTI 7 in association with the first HARQ process H1, the terminal device can combine its detection of that acknowledgement signalling (PERCH) with the acknowledgement signalling associated with HARQ process H2 arriving in TTI 11 to improve the estimate of ACK or NACK ahead of deciding whether to transmit data from the same TB in association with another HARQ process. For example, it might transpire that the ACK received in TTI 7 was erroneous and the terminal device may determine from a NACK received in TTI 11 that in fact the base station has not yet correctly received TB1 and so continue retransmissions associated with TB1 accordingly. It may be appropriate in some embodiments to bias the decision process on the two estimates towards NACK to reduce the probability of a terminal device does not sending a retransmission when it should.

Referring to the timing situation represented in FIG. 6 for which a NACK is received on TTI 7, there is generally no systematic reason for assuming the acknowledgement signalling on TTI 11 would be the same (because the base station may successfully decode TB1 based on Chase combining as discussed above). Accordingly it would be less appropriate in these circumstances for the terminal device to redundancy combine the acknowledgement signalling on TTI 7 and TTI 11. Accordingly, in embodiments where the terminal device does try to redundancy combine multiple occurrences of acknowledgement signalling, the terminal device may be configured to not do so when the first acknowledgement signalling represent a negative acknowledgement (NACK).

Another way of dealing with the unneeded acknowledgement signalling following a previous positive acknowledgement for the same transport block would be for the base station to simply transmit nothing in the relevant TTI when this circumstance arises. The terminal device would therefore fail to receive any acknowledgement signalling in the relevant TTI, and would normally interpret this as a NACK. However, as discussed above, the terminal device can be configured to in effect assume an ACK in these circumstances based on the previously received ACK. This is equivalent to the HARQ process associated with transmitted data associated with the unneeded acknowledgement signalling being adapted to avoid retransmissions of the same data based on positive acknowledgement signalling associated with the earlier transmission of data from the same transport block.

In yet another example, the resources associated with unneeded acknowledgement signalling may be used to convey other information from the base station to the terminal device. Referring to the example sequence of acknowledgement signalling of FIG. 7 as an example, TB1 is transmitted in association with HARQ process H1 and is positively acknowledged (ACKed) in TTI 7. This means the acknowledgement signalling in TTI 11 is not needed for the purposes of communicating from the base station to the terminal device information regarding whether or not the transport block has been successfully received (since this information is already provided by the ACK in TTI 7). Accordingly, the base station may be configured to communicate signalling corresponding to an ACK or a NACK to communicate one bit of information to the terminal device. That is to say, the terminal device may be configured to respond differently, for example in respect of future transmissions such as those associated with HARQ processes H4, in dependence on whether an ACK or a NACK is received as acknowledgement signalling associated with a particular HARQ process operating for a particular transport block following a previously received positive acknowledgement in respect of a different HARQ process operating on the same transport block. Thus, in this example, instead of either sending another ACK or no acknowledgement signalling at all in TTI 11, the base station sends either ACK or NACK according to a state it wishes to indicate to the terminal device. This one bit state information (i.e. with one state corresponding to an ACK followed by a NACK for the same transport block and the other state corresponding to an ACK followed by another ACK same transport block) may be used to switch between possible operating aspects of future transmissions.

In one example the state information may be used to control a change of modulation and coding scheme (MCS) for transmissions in association with the following HARQ process H4, either to a default or to a particular choice. In one example, this could indicate one of the two modulation schemes which were not used for the previous transmissions. For example, if 64-QAM was used in association with HARQ processes H1, H2 and H3 then an ACK received in TTI 11 might following the ACK in TTI 7 might be predefined as indicating 16-QAM should be used for HARQ process H4, while a NACK received in TTI 11 might be defined as indicating QPSK should be used. If there is a change of modulation scheme the base station may perform combining at the soft-bit decision level rather than the symbol level.

Figure 4:
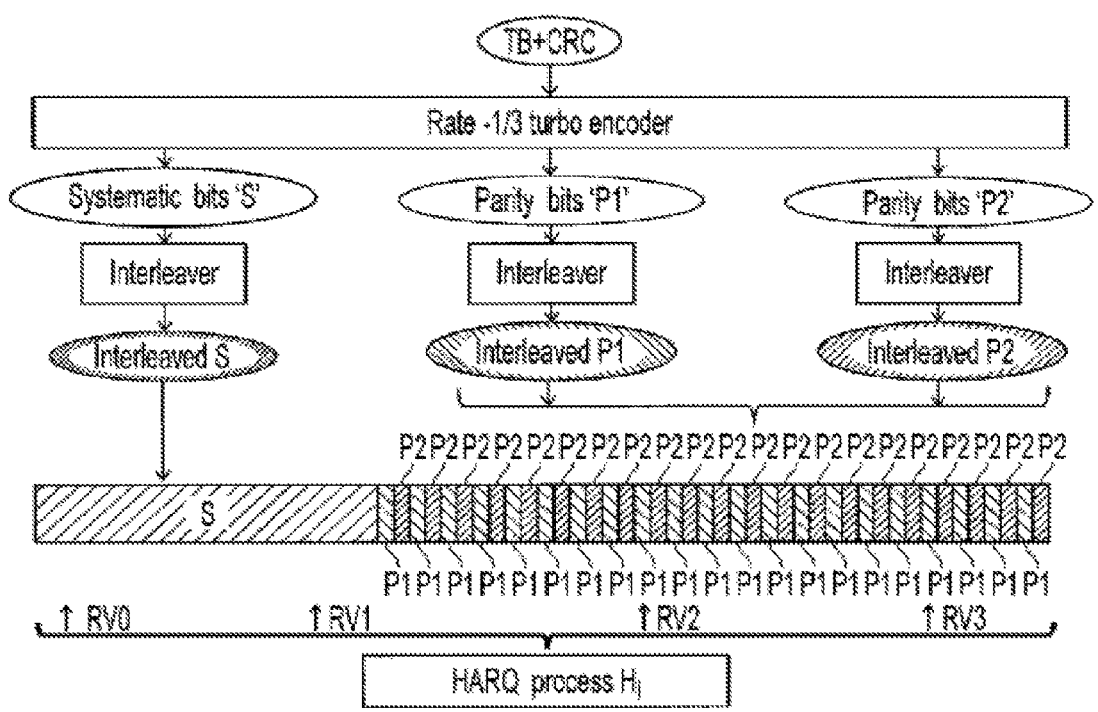
FIG. 4 schematically represents how redundancy versions associated with a transport block are generated for uplink transmission in an LTE-type network.

In another example the state information conveyed instead of unneeded acknowledgement signalling may be used to control the transmission of a different set of RVs in association with HARQ process H4, for example to transmit a particular pattern of the RVs which is different from the usual RV0-RV2-RV3-RV1 order, or a particular RV repeatedly, which contains more parity or more systematic bits depending on the base stations estimation of which is more likely to produce correct decoding. For example, RV0 may contain more systematic bits than the other RVs since it is close to the start of the circular buffer schematically depicted in FIG. 4.

In another example the state information conveyed instead of unneeded acknowledgement signalling may be used to configure the terminal device to not transmit all RVs of the next transport block, e.g. TB2 in the example of FIG. 7, in HARQ process H4's TTIs, and also not to transmit data from any other transport blocks in those TTIs, thus saving the terminal device's transmit power, and potentially allowing other terminal devices to be scheduled in corresponding resources in the unused TTIs. This may be appropriate if the base station decides that channel conditions are sufficiently good that it is unlikely to require the complete transmission of TB2 association with HARQ process H4.

In another example the state information may again be used to configure the terminal device to not transmit all RVs of the next transport block, e.g. TB2 in the example of FIG. 7, in HARQ process H4's TTIs, however, in a variation of the above approach, the terminal device may transmit data from another transport block, for example TB3, in the TTIs that are not used for transmitting data from TB2. This might be referred to as an approach based on splitting TTI bundles. An approach in accordance with this embodiment is schematically presented in FIG. 10. Here the terminal device receives an ACK in TTI 7 in respect of TB1 rendering the acknowledgement signalling from TTI 11 redundant. In accordance with this embodiment of the invention, an appropriate choice of ACK or NACK based on a predefined correspondence is transmitted in TTI 11 to configure the terminal device to implement a split TTI bundle for the next transmission under control of HARQ process H4. In this particular example, the TTIs associated with HARQ process H4 are allocated such that TTIs 12 and 13 are used for transmission of data from TB2 (RV0 and RV2 in this example) while TTIs 14 and 15 are used for transmission of data from TB3 (RV0 and RV2). This kind of split-bundling approach can be appropriate in circumstances where channel conditions are such that the base station is expected to be unlikely to correctly decode a transport block from a single TTI bundle, but is also unlikely to need a complete retransmission of a second TTI bundle to correctly decode the data.

One aspect of this approach relates to how acknowledgement signalling associated with a HARQ process containing data from multiple transport blocks should be interpreted. That is to say, there is a question as to whether the acknowledgement signalling in TTI 19 of FIG. 10 should relate to an indication of whether the base station has successfully received TB2 or whether the base station has successfully received TB3.

Figure 10:
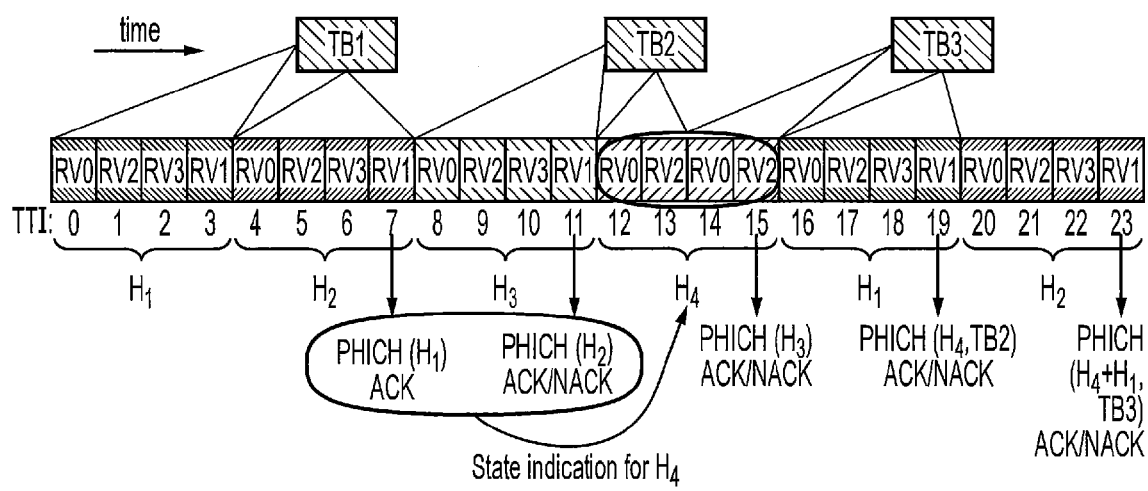

One approach for dealing with this would be to associate the acknowledgement signalling in TTI 19 of FIG. 10 with TB2. This would mean it would not be possible to prevent the next transmission of data from TB3 in TTIs 16 to 19 in association with HARQ process H1. Acknowledgement signalling associated with the data from TB3 in TTIs 14 and 15 would thus be conveyed as a single indication in TTI 23 and which takes account of whether they base station can decode TB3 based on the transmissions in TTIs 14 to 19.

Another approach would be for the base station to establish separate acknowledgement indications for TB2 and TB3 and to logically AND these to generate the acknowledgement signalling to be associated with the split bundle. This kind of ACK/NACK bundling is already known on PHICH in TDD systems, whereby the two ACK/NACKs can be logically ANDed before transmission. A drawback of this approach is a potential retransmission of data for a transport block which was correctly received by the base station if the other transport block was not correctly received on the base of split bundle, thereby delaying conclusion of the HARQ process for the correctly received transport block.

In effect the above-described "split bundling" approach may be considered as providing for variable-length TTI-bundling. In addition to having application where a base station may be expected to typically be able to correctly decode transmissions without requiring an integer number of complete bundles, embodiments of the invention implementing this approach could allow a base station to adapt an uplink transmission structure according to different priorities of data in different transport blocks, for example providing additional resources for more important data. In some examples the state information conveyed instead of unneeded acknowledgement signalling may be used to activate and deactivate split bundling in a subsequent transmission. In other examples it may be assumed that split bundling will always be used, and the state information can be used to convey how the subsequent transmission is split between the two transport blocks, for example, whether to allocate two TTIs to each transport block, or one TTI to one transport block three TTIs to the other transport block, or vice versa. The network may be configured to assign two options from the available combinations to respective ones of the two states.

Figure 11:
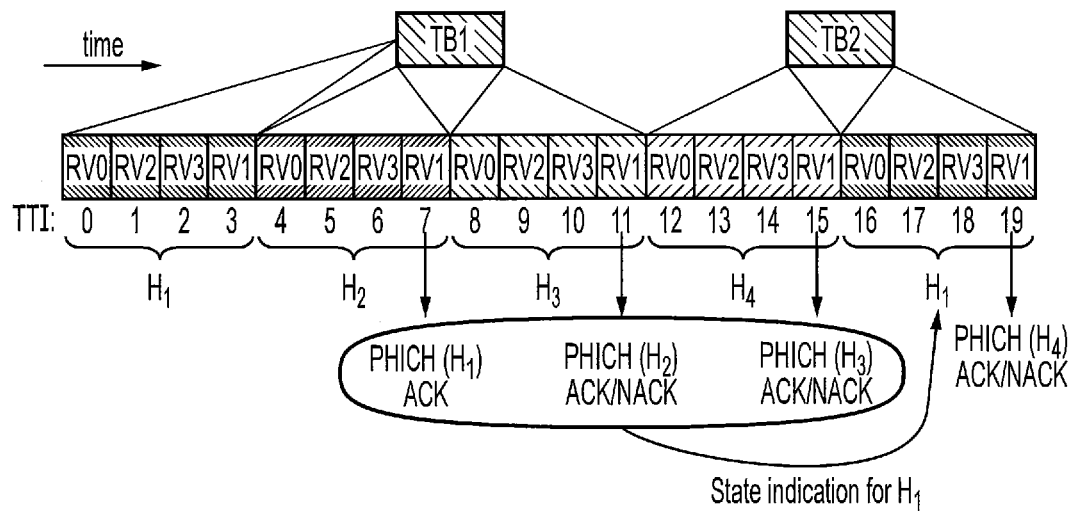

As noted above, if a terminal device receiving positive acknowledgement signalling in respect of a given transport block in a given TTI is not able to respond sufficiently fast to prevent an immediately following transmission of data from the same transport block there may be two unneeded acknowledgement signalling resource allocations. For example, with reference to FIG. 8, the acknowledgement signalling allocations for TTI 11 and TTI 15 are both unneeded because they both relate to transmissions of data associated with transport block TB1, which has already been successfully communicated to the base station, as indicated by the ACK signalling in TTI 7. In this case the resources associated with both the unneeded acknowledgement signalling TTIs can be used to convey state information for controlling subsequent transmissions. In this case there are two bits of state information that can be conveyed. An example of this approach is schematically indicated in FIG. 11. FIG. 11 is similar to, and will be understood from, FIG. 8, except in FIG. 11 all four RVs associated with TB1 are transmitted in association with HARQ process H3 (i.e. this implementation does not involve the curtailing of some unnecessary RV transmissions as in FIG. 8). Thus, the acknowledgement signalling received in TTI 11 and in TTI 15 are both unnecessary since both relate to transport block TB1 which has already been positively acknowledged in TTI 7. Accordingly, the base station may configure the ACK or NACK status of both the unneeded acknowledgement signals to convey two bits of state information for controlling subsequent transmissions, for example starting from the second occurrence of HARQ process H1 represented in FIG. 11.

Figure 12:
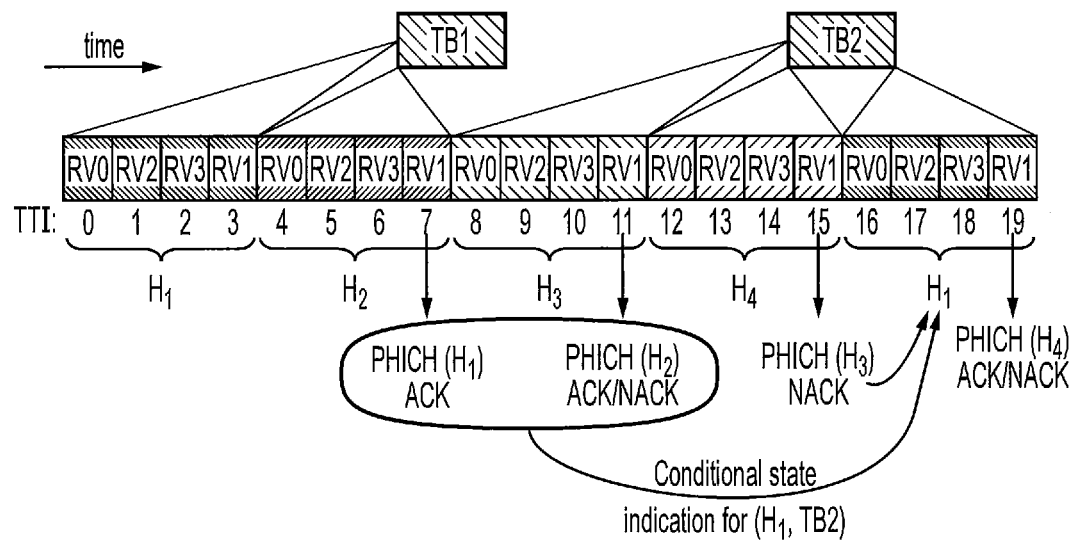

In the above examples in which additional information is conveyed in place of acknowledgement signalling that is not required, the state information may be applied unconditionally. In other examples, the state information may be used to modify future transmissions in dependence on acknowledgement signalling associated with other future transmissions. That is to say, the terminal device may be configured to respond to the information conveyed in place of unneeded acknowledgement signalling according to whether future transmissions are associated with positive or negative acknowledgement signalling. An approach of this kind is schematically represented in FIG. 12. In this example a first HARQ process H1 relating to data from TB1 is positively acknowledged in TTI 7 which means the acknowledgement signalling associated with the second HARQ process H2 in TTI 11 is unneeded as described above. Thus, the base station may convey state information for configuring future uplink transmissions on these resources such as described above. However, in this example it is assumed this configuration is not applied immediately. Accordingly, a second transmission of data from TB2 in association with HARQ process H4 is unaffected. For the purposes of this example it is assumed the first transmission of data from TB2 in association with HARQ process H3 is negatively acknowledged in TTI 15. As a result a third transmission of TB2 begins in TTI 16 in association with the first HARQ process H1. In accordance with some example implementations the uplink configuration information conveyed in place of the unneeded acknowledgement signalling associated with TTI 11 may be applied for the third transmission of data from TB2 starting from TTI 16. However, if in fact the first transmission of data from TB2 in association with HARQ process H3 is positively acknowledged in TTI 15, the terminal device may be configured to discard the state information conveyed in TTI 11. This "conditional" approach allows a base station to configure a terminal device to pre-select an uplink configuration which will only be used if a previous attempted transmission has failed.

In accordance with this approach the base station speculatively provides configuration information to the terminal device in TTI 11 without knowing whether it will be used or under what precise circumstances. The base station may, for example, be configured to select a speculative configuration state on the basis of a recent history of HARQ performance.

In the above described embodiments one HARQ process is able to control (interrupt) another HARQ processes when it receives a positive acknowledgement (ACK). However, in some circumstances it may also be helpful for one HARQ process to control (interrupt) another HARQ process when it receives a negative acknowledgement (NACK), and in particular, when NACKs are being repeatedly received. If channel conditions are particularly poor, or there is a fault in a transmission chain, uplink transmissions may be repeatedly negatively acknowledged. This means a terminal device may continue to occupy its granted resource for an extended duration, reducing the resources available to other terminal devices, some of which might be associated with higher priority data, for example as judged by existing QoS class indicators.

To reduce the potential impact of this situation arising, in accordance with some embodiments of the invention a base station conveying a negative acknowledgment in respect of a particular uplink transmission may also be configured to indicate that the terminal device should not attempt any retransmissions, at least not in accordance with its existing retransmission protocols. If one spatial codeword is being transmitted, this could be done, for example, by using the second PHICH of ACK/NACK signalling that is available in the case of two spatial codewords being transmitted. To allow this to be used for the purpose described, it could be signalled, e.g. at RRC (radio resource control), that the approach is being implemented, and that even though a single codeword had been transmitted, the terminal device is to expect two PHICH indications to be sent, the second being provided to convey a retransmission cancellation/suspend indicator.

If two uplink codewords have been transmitted, a different approach may be used. For example, one or more of the eight conventional PHICH sequences could be reserved for a PHICH carrying a cancellation indicator. A terminal device could be configured to detect both its own PHICH sequence and the reserved sequence in a subframe. Such a reserved PHICH index would apply to all terminal devices within a PHICH group which have been configured to respond to it, so suitable scheduling could be employed. This configuration could be carried, for example, in an RRC message, or it could be broadcast. This approach could apply regardless of the number of codewords transmitted by the UE.

If PDCCH control of HARQ is being used in a particular subframe instead of PHICH, a new bit could be added to DCI Formats 0 and 4 to provide a retransmission cancellation indication.

The base station may schedule uplink transmissions from higher-priority terminal devices in the surrendered resources (i.e. resources associated with the cancelled retransmissions), or could schedule a higher-priority traffic stream from the same terminal device.

A terminal device might be configured to resume its retransmissions following an uplink grant delivered on PDCCH DCI Format 0 or 4, with NDI not toggled. Alternatively, the number of transmission opportunities (TTI bundles of subframes in which the cancelled HARQ process is allowed transmit) that are cancelled can be pre-specified as some fixed number, or signalled by RRC in a terminal device-specific manner or by broadcast signalling in the cell, for example in a SIB (system information block) or MIB (master information block). If a broadcast form is used, all terminal devices may be configured to respond according to some common understanding as to when a surrendered retransmission resource will become available again, but the higher-priority transmission would need to finish within the specified number of transmission opportunities. If it does not, then pre-specification or configuration could provide that the usurping terminal device must in turn surrender the resources after the relevant duration has passed so that the original terminal device can resume its retransmissions. The base station would remain free to immediately re-cancel any retransmissions from the original terminal device if the transmissions at the higher priority transmissions have still not been correctly received.

Thus, as described above, embodiments of the invention can provide for the use of Chase combining in respect of multiple transmissions of data associated with a particular transport block more quickly than with conventional schemes while providing additional signalling to minimise wasted transmissions during the process. Furthermore, approaches in accordance with some embodiments of the invention do not require significant alteration to the fundamental HARQ structure at MAC since the conventional number of HARQ processes and entities and the basic HARQ timeline can be retained (although this need not be the case for some other embodiments).

As opposed to simply extending a TTI bundle length to longer durations, such as 16 TTIs, approaches in accordance with the above-described techniques can obtain gains from repeated transmissions on short timescales with the flexibility to prevent unnecessary retransmissions at an early stages by providing an inter-process interruption capability.

The potential for inter-process interruptions can lead to unneeded ACK/NACK signalling slots from the base station. In accordance with some embodiments the unneeded ACK NACK signalling can be suppressed, improving PHICH capacity, or can be used to reduce the probability of incorrect detection of ACK/NACK through combining, or can be re-used to convey additional information for inter-HARQ-process control, thereby providing PHICH (or corresponding channels in non-LTE implementations) with some of the capability of PDCCH-controlled HARQ, and thus reduce the need for such signalling to be carried on PDCCH, where capacity can be limited.

In accordance with some embodiments a base station may be configured to cancel retransmission attempts that would otherwise occur in accordance with a terminal device's retransmission protocols. This approach may, for example, be particularly relevant for machine type communication (MTC) devices which are often delay tolerant. Allowing a base station to cancel retransmission attempts in this way can provide additional flexibility to the HARQ process, making resource use more opportunistic and improving the match of resource allocation to QoS requirements; in present systems only conventional scheduling is available to help achieve these goals.

It will be appreciated that whilst the above-described embodiments are primarily focused on modifying the HARQ process as currently specified in LTE, the applicability of the principles of embodiments of the invention is not limited to such schemes. Furthermore, where the described examples have referred to particular HARQ process numbers, TTI numbers, and ACK/NACK responses, it will be appreciated these are provided purely for the sake of some concrete examples. More generally, it will be appreciated that the retransmission protocols described herein may be applied in an on-going manner in which the various HARQ processes are cycled through in parallel. It will be appreciated that references to retransmission protocol processes operating in parallel is not intended as indicating the respective processes are co-synchronous, but rather they are operating at the same time, albeit in different phases.

It will further be appreciated that the principles underlying embodiments of the invention may apply equally to TDD systems and FDD systems, although the precise TTI and HARQ process numbering (number thereof) and timings will be different for TDD operation, as with conventional TDD HARQ operation.

It will still further be appreciated that whilst the above-described embodiments have focused on TTI-bundling embodiments, similar principles can be applied in a non-TTI-bundling context. For example by assigning the four RVs of a transport block cyclically to the eight HARQ processes conventionally associated with non-TTI-bundling.

Some significant differences between approaches in accordance with some embodiments of the invention and existing schemes are as follows:

(1) In existing schemes the parallel HARQ processes at a terminal would each transmit data from separate transport blocks from their own independent circular buffers (2) In current systems, there is no ability for one HARQ process to provide any control over another, whereas embodiments of the invention the invention can provide for such a possibility to govern the retransmission of an earlier HARQ process and also to govern the contents of planned transmission of impending processes.

(3) In current systems, there is no ability for HARQ feedback on PHICH on one process to be used to control generally a terminal device with respect to another HARQ process. This kind of inter-HARQ-process communication and potential implicit signalling on successive HARQ ACK/NACKs is not known in existing schemes.

(4) In current systems, there is no ability for variable-length TTI bundling of kind schematically shown in FIG. 10.

It may be noted that in principle another way of shortening the latency of TTI-bundled retransmissions could be to reduce the number of parallel HARQ processes at the terminal device, whilst not making them transmit data associated with the same transport block (i.e. not draw from the same buffer) or be interruptible. However, if they were reduced to a single HARQ process, there would be alternate sets of four unused TTIs whilst the UE waited for ACK/NACK feedback. This would be true regardless of bundle length, and the number of unused TTIs would grow as the bundle length. If they were reduced instead to two parallel HARQ processes, the unused bundles of TTIs could now be used by the second process, but there would still be latency prior to a retransmission.

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term user equipment (UE) as used herein can be replaced with other terms user equipment (UE), mobile communications device, terminal device etc. Furthermore, although the term base station has been used interchangeably with eNodeB it should be understood that there is no difference in functionality between these network entities.

Thus, there has been described a method of controlling the communication of data, e.g. corresponding to a transport block, from a terminal device to a base station in a wireless telecommunications system supporting multiple retransmission protocol processes. The method comprises; making a first uplink transmission of data from the transport block in association with a first retransmission protocol process and obtaining a corresponding first acknowledgement indication for indicating whether the transport block has been successfully communicated to the base station in response thereto; making a second uplink transmission of data from the transport block in association with a second retransmission protocol process and obtaining a corresponding second acknowledgement indication in response thereto, wherein the second transmission is initiated before the first acknowledgement indication is obtained, and the method further comprises avoiding retransmission of data from the transport block in association with the first retransmission protocol process if either one of the first acknowledgement indication or the second acknowledgement indication indicates the transport block has been successfully communicated to the base station.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "*LTE for UMTS OFDIVIA and SC-FDMA based radio access*", John Wiley and Sons, 2009
[2] ETSI TS 136 321 V10.6.0 (2012-10)/3GPP TS 36.321 version 10.6.0 Release 10
[3] 3GPP TDoc R1-080443 from 3GPP TSG-RAN WG1 #51-bis Sevilla, Spain, Jan. 14-18, 2008
[4] 3GPP TDoc R2-074889 from 3GPP TSG-RAN WG2 #60 Jeju, Korea, Nov. 5-9, 2007.
[5] 3GPP TDoc R2-074940 from 3GPP TSG-RAN WG2 #60 Jeju, Korea, Nov. 5-9, 2007.

The invention claimed is:

1. A method of communication, comprising:
transmitting, by circuitry of a terminal device to a base station in a wireless communications system supporting multiple parallel retransmission protocol processes, a first transmission of a data block in a first transport block according to a first retransmission protocol process;
receiving a first response signaling that indicates whether the first transmission of the data block has been successfully communicated to the base station;
transmitting, by the circuitry before the first response is received, a second transmission of the data block in the first transport block according to a second retransmission protocol process;
receiving a second response signaling that indicates whether the second transmission of the data block has been successfully communicated to the base station; and
determining, by the circuitry, to retransmit the data block in the first transport block according to the first retransmission protocol process based on both the first response signaling and the second response signaling, wherein
transmitting the first transmission of the data block in the first transport block, the second transmission of the data block in the first transport block and a retransmission of the data block in the first transport block each comprise transmitting, by the circuitry at a series of transmission time intervals (TTIs), a plurality of redundancy versions (RVs) of data of the data block.

2. The method of claim 1, wherein the determining whether to retransmit the data block according to the first retransmission protocol process comprises avoiding retransmission of the data block according to the first retransmission protocol process when either one of the first response signaling or the second response signaling indicates that the data block has been successfully communicated to the base station.

3. The method of claim 1, wherein
an uplink radio frame structure for the wireless telecommunications system comprises the series of TTIs, and
the first and second transmissions of the data block each comprise respective bundles of TTIs.

4. The method of claim 3, wherein the respective transmissions in different TTIs of a bundle of TTIs comprise transmissions of different bits for the data block.

5. The method of claim 4, wherein the different bits for the data block transmitted in the different TTIs of a bundle of TTIs comprise different RVs derived for the data block.

6. The method of claim 1, wherein the first and second transmissions comprise transmissions of the same bits for the data block.

7. The method of claim 1, wherein the first and second transmissions comprise transmissions of different bits for the data block.

8. The method of claim 7, wherein the different bits for the data block transmitted in the first and second transmissions of data for the data block comprise different RVs derived for the data block.

9. The method of claim 1, further comprising:
transmitting, by the circuitry, a further transmission of the data block according to a further retransmission protocol process; and
receiving a further response signaling in response to the further transmission.

10. The method of claim 9, wherein
the further transmission is initiated before the second response signaling is received, and
the determining whether to retransmit the data block according to the first and second retransmission protocol processes further based on the first response signaling, the second response signaling and the further response signaling.

11. The method of claim 10, wherein the determining whether to retransmit the data block according to the first and second retransmission protocol processes further comprises avoiding retransmission of the data block according to the first and the second retransmission protocol processes when any of the first response signaling or the second response signaling or the further response signaling indicates that the data block has been successfully communicated to the base station.

12. The method of claim 9, wherein
the further transmission of the data block according to the further retransmission protocol process is performed before the first transmission of the data block according to the first retransmission protocol process, and
the method comprises avoiding retransmission of the data block according to the further retransmission protocol process when either of the first response signaling or the second response signaling indicates the data block has been successfully communicated to the base station.

13. The method of claim 1, further comprising avoiding retransmission of the data block according the second retransmission protocol process when the first response signaling indicates the data block has been successfully communicated to the base station.

14. The method of claim 1, further comprising:
deriving, by the circuitry, second information from the second response signaling that is different from first information indicating whether the data block has been successfully communicated to the base station in the event the first response signaling already indicates the data block has been successfully communicated to the base station.

15. The method of claim 14, wherein the second information comprises an indication that the terminal device should modify one or more parameters associated with subsequent transmissions of data to the base station.

16. The method of claim 15, wherein the one or more parameters relates to one or more elements from the group comprising: a modulation coding scheme, a selection of bits for transmission from a data block, an instruction to transmit a reduced amount of data for a data block, and an instruction to transmit data from multiple data blocks in associated with a single protocol transmission process.

17. The method of claim 1, further comprising:
transmitting, by the circuitry, a third transmission of a different data block in a second transport block according to a third retransmission protocol process;
receiving a third response signaling that indicates whether the third transmission of the different data block has been successfully communicated to the base station;
transmitting, by the circuitry, a fourth transmission of the different data block in the second transport block according to a fourth retransmission protocol process before the third response is received;
receiving a fourth response signaling in response to the fourth transmission; and
determining, by the circuitry, whether to retransmit the different data block in the second transport block according to the third retransmission protocol process based on both the third response signaling and the fourth response signaling.

18. The method of claim 1, comprising determining whether the data block has been successfully communicated to the base station according to a combination of the first response signaling and the second response signaling.

19. The method of claim 1, further comprising transmitting the data for the data block and data from another data block according to a single retransmission protocol process.

20. The method of claim 1, wherein the first response signaling is received on a physical retransmission protocol indicator channel transmitted by the base station.

21. The method of claim 1, wherein the first response signaling is received in downlink control information transmitted by the base station.

22. The method of claim 1, wherein the respective first and second retransmission protocol processes are hybrid automatic repeat request (HARQ) processes.

23. A terminal device for communicating to a base station in a wireless telecommunications system supporting multiple parallel retransmission protocol processes, the terminal device comprising:
circuitry configured to
transmit a first transmission of a data block in a first transport block according to a first retransmission protocol process;
receive a first response signaling that indicates whether the first transmission of the data block has been successfully communicated to the base station;
transmit, before the first response is received, a second transmission of data of the data block in the first transport block according to a second retransmission protocol process;
receive a second response signaling that indicates whether the second transmission of the data block has been successfully communicated to the base station; and
determine to retransmit the data block in the first transport block according to the first retransmission protocol process based on both the first response signaling and the second response signaling, wherein
the circuitry transmits, for each the first transmission of the data block in the first transport block, the second transmission of the data block in the first transport block and a retransmission of the data block in the first transport block, a plurality of redundancy versions (RVs) of data of the data block at a series of transmission time intervals (TTIs).

24. The terminal device of claim 23, wherein the circuitry is configured to avoid retransmission of the data block according to either of the first response signaling or the second response signaling indicates the data block has been successfully communicated to the base station.

25. The terminal device of claim 23, wherein
an uplink radio frame structure for the wireless telecommunications system comprises the series of TTIs, and
the first and second transmissions of the data block each comprise respective bundles of TTIs.

26. The terminal device of claim 25, wherein the respective transmissions in different TTIs of a bundle of TTIs comprise transmissions of different bits for the data block.

27. The terminal device of claim 26, wherein the different bits for the data block transmitted in the different TTIs of a bundle of TTIs comprise different RVs derived for the data block.

28. The terminal device of claim 23, wherein the first and second transmissions comprise transmissions of the same bits for the data block.

29. The terminal device of claim 23, wherein the first and second transmissions comprise transmissions of different bits for the data block.

30. The terminal device of claim 29, wherein the different bits for the data block transmitted in the first and second transmissions of data for the data block comprise different RVs derived for the data block.

31. The terminal device of claim 23, wherein the circuitry is further configured to
transmit a further transmission of the data block according to a further retransmission protocol process; and
receive a further response signaling in response to the further transmission.

32. The terminal device of claim 31, wherein
the circuitry transmits the further transmission before the second response signaling is received, and
the circuitry determines whether to avoid retransmission of the data block according to the first and second retransmission protocol processes based on the first response signaling, the second response signaling and the further response signaling.

33. The terminal device of claim 32, wherein the circuitry is configured to avoid retransmission of the data block according to the first and the second retransmission protocol processes when any one of the first response signaling, the second response signaling or the further response signaling indicates that the data block has been successfully communicated to the base station.

34. The terminal device of claim 31, wherein
the circuitry transmits the further transmission of the data block according to the further retransmission protocol process before the first transmission of the data block according to the first retransmission protocol process,
the circuitry is configured to avoid retransmission of the data block according to the further retransmission protocol process when either of the first response signaling or the second response signaling indicates the data block has been successfully communicated to the base station.

35. The terminal device of claim 23, wherein the circuitry is configured to avoid retransmission of the data block according to the second retransmission protocol process when the first response signaling indicates the data block has been successfully communicated to the base station.

36. The terminal device of claim 23, wherein the circuitry is configured to derive second information from the second response signaling that is different from first information indicating whether the data block has been successfully communicated to the base station in the event the first response signaling already indicates the data block has been successfully communicated to the base station.

37. The terminal device of claim 36, wherein the second information comprises an indication that the terminal device should modify one or more parameters associated with subsequent transmissions of data to the base station.

38. The terminal device of claim 37, wherein the one or more parameters relates to one or more elements from the group comprising: a modulation coding scheme, a selection of bits for transmission from a data block, an instruction to transmit a reduced amount of data for a data block, and an instruction to transmit data from multiple data blocks in associated with a single protocol transmission process.

39. The terminal device of claim 23, wherein the circuitry is further configured to
transmit a third transmission of a different data block in a second transport block according to a third retransmission protocol process;
receive a third response signaling that indicates whether the third transmission of the different data block has been successfully communicated to the base station;
transmit a fourth transmission of the different data block in the second transport block according to a fourth retransmission protocol process before the third response is received;
receive a fourth response signaling in response to the fourth transmission; and
determine whether to retransmit the different data block in the second transport block according to the third retransmission protocol process based on both the third response signaling and the fourth response signaling.

40. The terminal device of claim 23, wherein the circuitry is configured to determine whether the data block has been successfully communicated to the base station based on a combination of the first response signaling and the second response signaling.

41. The terminal device of claim 23, wherein the circuitry is configured to transmit the data for the data block and data from another data block in association with a single retransmission protocol process.

42. The terminal device of claim 23, wherein the circuitry is configured receive the first response signaling on a physical retransmission protocol indicator channel transmitted by the base station.

43. The terminal device of claim 23, wherein the circuitry is configured to receive the first response signaling in downlink control information transmitted by the base station.

44. The terminal device of claim 23, wherein the respective retransmission protocol processes are hybrid automatic repeat request (HARQ) processes.

* * * * *